(12) United States Patent
Okada et al.

(10) Patent No.: US 6,728,258 B1
(45) Date of Patent: Apr. 27, 2004

(54) MULTI-PROCESSOR SYSTEM AND ITS NETWORK

(75) Inventors: Tetsuhiko Okada, Hachioji (JP); Naoki Hamanaka, Tokyo (JP); Naohiko Irie, Kawasaki (JP); Takehisa Hayashi, Sagamihara (JP); Tetsuya Mochida, Ebina (JP); Masabumi Shibata, Kawasaki (JP); Youichi Tanaka, Kanagawa-ken (JP); Yasuhiro Ishii, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/456,383

(22) Filed: Dec. 8, 1999

Related U.S. Application Data

(63) Continuation of application No. 08/747,344, filed on Nov. 12, 1996, now Pat. No. 6,011,791.

(30) Foreign Application Priority Data

Nov. 15, 1995 (JP) .............................................. 7-296473
Nov. 15, 1995 (JP) .............................................. 7-296479

(51) Int. Cl.$^7$ .............................................. H04L 12/66
(52) U.S. Cl. ...................... 370/463; 711/146; 370/390
(58) Field of Search ................................. 370/389, 312, 370/390, 432, 463; 711/146

(56) References Cited

U.S. PATENT DOCUMENTS

| | | |
|---|---|---|
| 5,153,876 A | 10/1992 | Sin |
| 5,165,021 A | 11/1992 | Wu et al. |
| 5,226,125 A | 7/1993 | Balmer et al. |
| 5,299,190 A | 3/1994 | LaMaire et al. |
| 5,303,362 A * | 4/1994 | Butts, Jr. et al. |
| 5,375,220 A | 12/1994 | Ishikawa |
| 5,394,555 A * | 2/1995 | Hunter et al. |
| 5,555,382 A * | 9/1996 | Thaller et al. |
| 5,588,131 A * | 12/1996 | Borrill |
| 5,659,710 A * | 8/1997 | Sherman et al. |
| 5,737,564 A * | 4/1998 | Shah |
| 5,740,400 A * | 4/1998 | Bowles |
| 6,484,220 B1 * | 11/2002 | Alvarez, II et al. |

FOREIGN PATENT DOCUMENTS

JP 4-328653 11/1992

OTHER PUBLICATIONS

Nicholson, "The RISC System/6000 SMP System", Compcon95 Proceedings, Mar. 1995, pp. 102–109.

* cited by examiner

*Primary Examiner*—Ajit Patel
*Assistant Examiner*—Steven A Blount
(74) *Attorney, Agent, or Firm*—Mattingly, Stanger & Malur, P.C.

(57) ABSTRACT

In a multi-processor system interconnecting processor units, memory units, and input/output units connected to input/output devices via a crossbar switch having a plurality of ports, the transmitter of each processor unit has a circuit for determining a destination of an access request in the following manner. For an access request to a main memory, the access request is transferred to all processor units and one memory unit storing the data to be accessed. For an access request to a memory mapped register of the input/output device, the access request is broadcast to all input/output units. For an access request to a memory mapped register belonging to any one of the processor units, memory units, and input/output units, the access request is broadcast to all units via the crossbar switch.

5 Claims, 18 Drawing Sheets

| INPUT | | | | OUTPUT |
|---|---|---|---|---|
| TYPE | G-i | A[0-3] | A[26] | REQ[0-7] |
| CREAD | ★ | 0~D | 0 | 11111000 |
|  | ★ | 0~D | 1 | 11110100 |
| NREAD NWRITE | ★ | 0~D | 0 | 00001000 |
|  | ★ | 0~D | 1 | 00000100 |
|  | ★ | E | ★ | 11111111 |
|  | ★ | F | ★ | 00000011 |
| WRITE BACK | ★ | 0~D | 0 | 00001000 |
|  | ★ | 0~D | 1 | 00000100 |
| RETURN | 0 | ★ | ★ | 10000000 |
|  | 1 | ★ | ★ | 01000000 |
|  | 2 | ★ | ★ | 00100000 |
|  | 3 | ★ | ★ | 00010000 |
|  | 4 | ★ | ★ | 00001000 |
|  | 5 | ★ | ★ | 00000100 |
|  | 6 | ★ | ★ | 00000010 |
|  | 7 | ★ | ★ | 00000001 |

FIG. 18

| IDR | UNIT |
|-----|------|
| 00 | PROCESSOR UNIT |
| 01 | INPUT/OUTPUT UNIT |
| 10 | MEMORY UNIT |
| 11 | NON CONECTION |

FIG. 19

| TRTYP | TYPES OF DATA TRANSFERS |
|-------|-------------------------|
| 0000 | NON-COHERENT    BLOCK READ REQUEST |
| 0010 | NON-COHERENT    BLOCK READ RESPONSE |
| 0100 | NON-COHERENT    BLOCK WRITE REQUEST |
| 0001 | NON-COHERENT    WORD READ REQUEST |
| 0011 | NON-COHERENT    WORD READ RESPONSE |
| 0101 | NON-COHERENT    WORD WRITE REQUEST |
| 1000 | COHERENT    SHARED BLOCK READ REQUEST |
| 1010 | COHERENT    PRIVATE BLOCK READ REQUEST |
| 1111 | NO TRANSFER REQUEST |

| ADDRESS RANGE | REGISTER | SET VALUE |
|---|---|---|
| 0~A | DR0 | 1 |
| A~B | DR1 | 4 |

| CONTROL INFORMATION OF CROSSBAR SWITCH CONNECTION PART | | SCCTL | | | | |
|---|---|---|---|---|---|---|
| UNI-CAST | 1-CYCLE TRANSFER | 0 | 0 | 0 | SRC | DEST |
| UNI-CAST | 2-CYCLE TRANSFER | 0 | 0 | 1 | SRC | DEST |
| UNI-CAST | 4-CYCLE TRANSFER | 0 | 1 | 0 | SRC | DEST |
| UNI-CAST | 5-CYCLE TRANSFER | 0 | 1 | 1 | SRC | DEST |
| BROADCAST | 1-CYCLE TRANSFER | 1 | 0 | 0 | SRC | DEST |
| NO TRANSFER REQUEST | | 1 | 1 | 1 | SRC | 1 1 1 |

| REGISTER | SET VALUE |
|---|---|
| MCRA | 001101 |
| MCRB | 100000 |

| CONTROL INFORMATION OF CROSS-BAR SWITCH CONNECTION PART | | SCCTL | | | | | |
|---|---|---|---|---|---|---|---|
| UNI-CAST | 1-CYCLE TRANSFER | 0 | 0 | 0 | SRC | DEST | |
| UNI-CAST | 2-CYCLE TRANSFER | 0 | 0 | 1 | SRC | DEST | |
| UNI-CAST | 4-CYCLE TRANSFER | 0 | 1 | 0 | SRC | DEST | |
| UNI-CAST | 5-CYCLE TRANSFER | 0 | 1 | 1 | SRC | DEST | |
| BROADCAST | 1-CYCLE TRANSFER | 1 | 0 | 0 | SRC | DEST | |
| MULTI-CAST | 1-CYCLE TRANSFER | 1 | 0 | 1 | SRC | DEST | |
| MULTI-CAST | 1-CYCLE TRANSFER | 1 | 1 | 0 | SRC | DEST | |
| NO TRANSFER REQUEST | | 1 | 1 | 1 | SRC | 1 1 1 | |

MULTI-PROCESSOR SYSTEM AND ITS NETWORK

This is a continuation application of U.S. Ser. No. 08/747,344, filed Nov. 12, 1996 now U.S. Pat. No. 6,011,791.

BACKGROUND OF THE INVENTION

The present invention relates to a multi-processor system having a plurality of processors in order to realize high performance.

A tightly coupled multi-processor system is a high performance computer system in which a plurality of processors share one main storage. In such system, a private cache is provided for each processor in order to reduce contention of access to the shared main storage. Use of these caches poses a problem of cache consistency control. A conventional multi-processor system is introduced in JP-A-4-328653 (Reference document 1). This reference document 1 discloses an invention which uses both an interconnection network and a modified snooping bus including address buses and control buses without data buses. Specifically, although cache consistency is controlled by hardware using an address of a modified snooping bus and a command, similar to conventional techniques, a cache block is transferred between a cache and the main storage or between caches for execution of consistency control via the interconnection network. With this method, the consistency control operation other than data transfer for each memory access can be executed in about one cycle by using an address and a command. Therefore, for a plurality of memory accesses, the consistency control operation other than cache block transfer can be executed sequentially for each cache.

Cache block transfer for consistency control operation for each memory access requires a plurality of cycles. However, different cache blocks can be transferred in parallel between a cache and the main storage or between caches, by using the interconnection network. As compared to the size of an address, the size of a cache block is generally large. Therefore, although address transfer is completed in one cycle, cache block transfer requires plural cycles. For example, assuming that cache block transfer requires eight cycles, cache block transfer requires eight cycles for one cycle address transfer. As described earlier, while an address is transferred via a bus, a cache block is transferred via a crossbar switch in parallel. This can improve the system performance considerably as compared to a conventional snoop system which transfers both the address and cache block via buses. This invention of the reference document 1 describes that various networks such as crossbar switches can be used as the interconnection network.

Another known technique is a so-called memory mapped I/O system. Various control registers, data registers, or the like of this system are mapped to an address space same as that of a main storage, and are accessed by a command of the same format as that of a memory access command used for access to the main storage. For conventional shared memory type multi-processor systems, this memory mapped I/O system is widely used. The reference document 1 does not describe memory mapped registers of the multi-processor system using the interconnection network disclosed therein, and their access method.

According to the invention described in the reference document 1, a plurality of memory accesses can be performed nearly in parallel by utilizing parallel data transfer via the interconnection network. With this method, however, there is a problem that the total number of processors connectable to the modified snooping buses is restricted considerably because of bottle neck of the buses.

An access request to a memory mapped register is preferably transferred to the unit containing the register via the interconnection network in order to simplify the system configuration. However, in order to identify the unit containing a memory mapped register assigned with the address designated by an access request, address allocation information indicating a distribution range of addresses assigned to all memory mapped registers contained in each unit, is required to be stored in advance in the system, and a circuit is required which identifies the unit containing a memory mapped register assigned with the address designated by an access request in accordance with the address designated by the access request and the stored address allocation information.

Memory mapped registers of the system include those in input/output devices connected to input/output units. The number and locations of input/output devices of the system are subject to change. Each time such change occurs, the address allocation information is required to be changed. Therefore, the circuit for identifying the unit containing a memory mapped register designated by an access request is required to deal with such address change, and the structure of the circuit becomes complicated.

Also in this system, if a plurality of processor units, memory units, and input/output units are connected by a single bus, there is only one path for data transfer between connected units. Therefore, this bus becomes a bottle neck in improving the system performance by increasing the number of processors.

In order to solve this problem, a method of using a bus for address transfer and a crossbar switch for data transfer has been proposed by James O. Nicholson, "The RISC System/6000 SMP System", COMPCON95 Proceedings, March 1995, pp. 102 to 109.

With this conventional method, although bus bottle neck in terms of throughput can be solved, it is not possible to increase the number of processors too greatly because of electrical constraints on signal transfer at high frequencies.

In order to solve this, an address is also transferred via the crossbar switch and each unit is connected to the crossbar switch in one-to-one correspondence.

In this case, in order to correctly run software of bus connection, data coherency between a cache memory and a main memory is required to be maintained even under crossbar switch connection. In order to connect a processor of bus connection to the crossbar switch, an address snoop method is required to be realized on the crossbar switch, the address snoop method being generally used as a method of maintaining data coherency of bus connection.

The address snoop method maintains data coherency between a cache memory and a main memory. With this method, it is not necessary to transfer an address to the memory units having no transfer data and to the units having no cache memory. Therefore, address transfer necessary for maintaining data coherency is performed only for the units required to participate in address snoop. The efficient address snoop method can therefore be realized by providing the crossbar switch with means for executing multi-cast of one-to-multi data transfer.

The invention has been made in order to solve the above problems. A first object of the invention is to provide a multi-processor system allowing a memory access derived from a cache to be monitored by another cache by using an interconnection network.

A second object of the invention is to provide a multi-processor system capable of such monitor without adversely affecting input/output units or the like not containing caches.

A third object of the invention is to provide a multi-processor system capable of simplifying a circuit for determining a transmission destination to a memory mapped register designated by an access request.

A fourth object of the invention is to provide a multi-processor system capable of simplifying a circuit for transferring to an input/output device an access request to a memory mapped register contained in the input/output device.

A fifth object of the invention is to provide a multi-processor system capable of simplifying a circuit for transferring to an input/output device an access request to a memory mapped register contained in the input/output device even if the number and combination of input/output devices are changed.

A sixth object of the invention is to solve a bus bottle neck by connecting bus-connected processors to a crossbar switch and improving the performance of a multi-processor system by increasing the number of connectable processors.

A seventh object of the invention is to make a system connected to a crossbar switch be operable without modifying software of a bus connected system.

An eighth object of the invention is to provide an efficient address snooping scheme for a multi-processor system connected by a crossbar switch.

A ninth object of the invention is to provide a multi-cast scheme allowing a flexible system configuration and capable of connecting desired units including processor units, memory units, and input/output units, to a crossbar switch.

SUMMARY OF THE INVENTION

In order to achieve the above objects of the invention, a transmission destination determining circuit is provided. If a processor unit issues an access to data in the main memory and the cache of the processor unit does not hit, the transmission destination determining circuit determines, as the transmission destination of the access, a plurality of destinations including one memory unit assigned with the address designated by the access request and all processor units.

A simple circuit is provided for transferring to an input/output device an access request to a memory mapped register. This circuit locally broadcasts to all input/output units the access request to a memory mapped register of an input/output device to all input/output units.

In this invention, a conventional address bus proposed by Nicholson is not used, but the address is passed through the crossbar switch whose port is connected in one-to-one correspondence to each unit. In order to use an address snoop scheme together with the crossbar switch, the crossbar switch is provided with means for broadcast an address to all units connected to the crossbar switch. In transferring an address necessary for maintaining data coherency, the crossbar switch is controlled so that the address is transferred to all units.

The crossbar switch is provided with means for multi-casting an address necessary for maintaining data coherency only to those units required to participate in address snoop. The address necessary for maintaining data coherency is transferred only to those units required to participate in address snoop. The crossbar switch is provided with means for storing information indicating whether the unit connected to each port is associated with multi-cast, and with means for determining a destination port in accordance with the stored information. Multi-cast is performed after setting a multi-cast destination to means for determining a destination port in accordance with the information indicating whether each unit is associated with multi-cast.

As above, each unit is connected to the crossbar switch so that a plurality of data transfers can be executed at the same time if the destination ports are different. Therefore, a system performance can be suppressed from being degraded by bus contention because of an increased number of processors.

Since each unit is connected in one-to-one correspondence to each port of the crossbar switch, a better electric performance can be obtained than a bus connected system. Therefore, the number of connectable processors can be increased.

The address necessary for maintaining data coherency is broadcast so that the address snoop function of conventional processors can be utilized realizing a low cost and efficient method of maintaining data coherency.

The address of a coherent transaction is transferred only to those units required to participate in address snoop, among the units connected to the ports. Therefore, unnecessary data transfers can be eliminated and an effective data transfer throughput can be improved.

Since the information indicating whether each unit at each port is associated with multi-cast is stored, it becomes possible to connect each unit to a desired port, allowing a flexible system configuration.

Although the multi-cast of the invention is described by using address snoop by way of example, the invention, is generally applicable to the case wherein data is transferred to a plurality of ports.

For example, in transferring a reset command to all input/output devices, means is provided for storing information indicating whether each port is connected to an input/output unit and whether each input/output unit is associated with multi-cast.

BRIEF DESCRIPTION OF THE DRAWINGS

FIG. 18 is a diagram illustrating a unit identifying method.

FIG. 19 is a diagram showing the types of data transfers.

DESCRIPTION OF THE PREFERRED EMBODIMENTS

The multi-process of this invention will be further detailed with reference to embodiments illustrated in the accompanying drawings.

<1st Embodiment>

(Outline of System Configuration)

Figure 1:
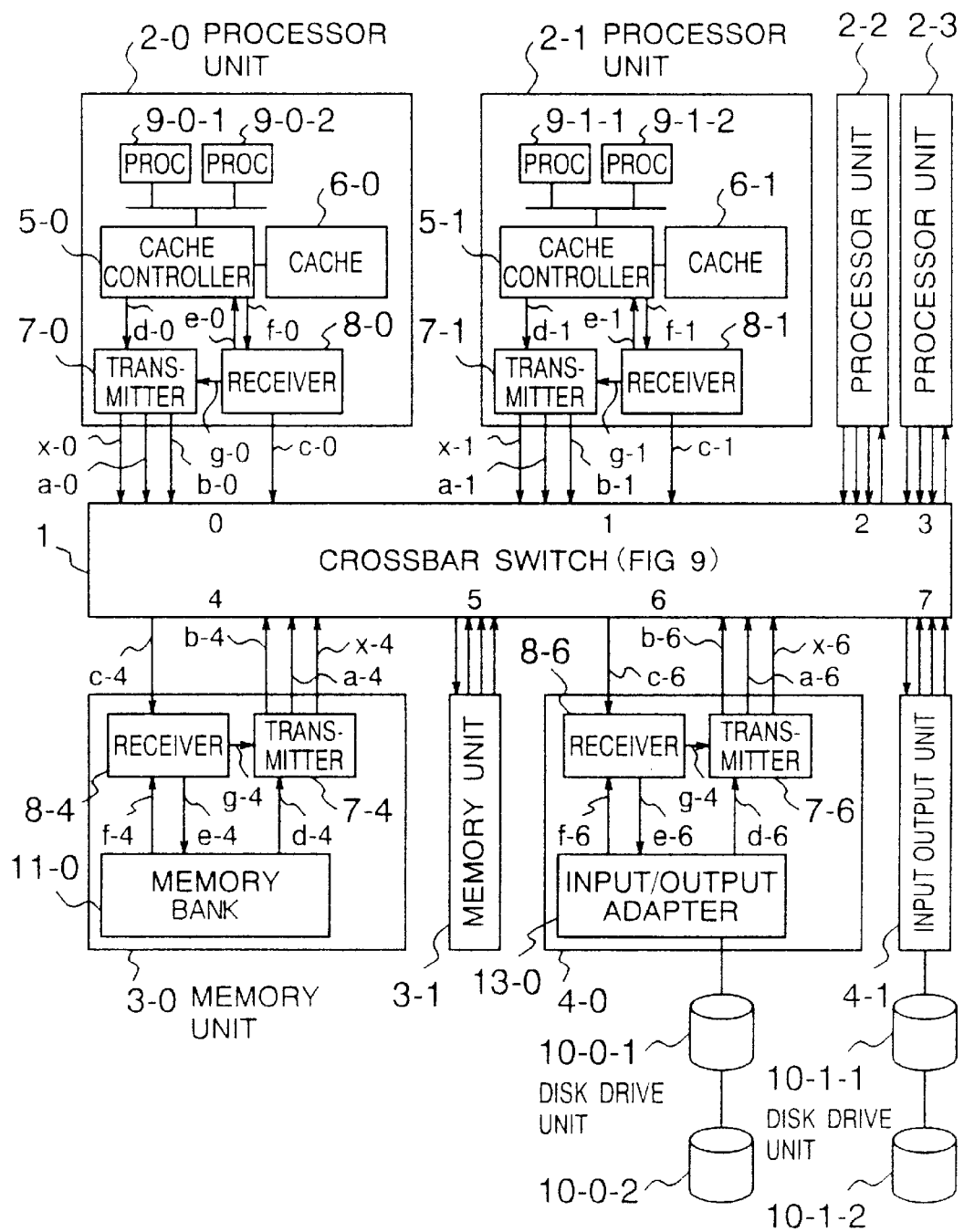
FIG. 1 shows the overall structure of a multi-processor system according to a first embodiment of the invention.

FIG. 1 shows a multi-processor system according to the first embodiment of the invention. In FIG. 1, reference numerals 2-0 to 2-3 represent processor units, and reference numerals 3-0 and 3-1 represent memory units. A plurality of main memory portions constituting part of a main memory shared by the plurality of processor units 2-0 to 2-3 are distributed and stored in these memory units 3-0 and 3-1. Reference numerals 4-0 and 4-1 represent input/output units which are connected to a plurality of input/output devices, e.g., disk drive units 10-0-1 and 10-0-2, and 10-1-1 and 10-1-2. Other input/output devices (not shown) such as line connection devices are also connected to the input/output units. Reference numeral 1 represents an interconnection network for interconnecting the processor units 2-0 to 2-3, memory units 3-0 and 3-1, and input/output units 4-0 and 4-1. The interconnection network can transfer a plurality of data blocks called transactions in parallel to and from these units. In this embodiment, a crossbar switch is used as the interconnection network, by way of example.

Each processor unit 2-i (i=0, 1, 2, or 3) has the same structure, and includes one or more processors (Proc) 9-i-1 and 9-i-2 (i=0, 1, . . . ), a cache memory 6-i, and a cache controller 5-i for the main memory. Each processor has a processor cache (not shown) faster and smaller in capacity than the cache memory 5-0. In this embodiment, both the processor cache and cache memory 6-i are of a store-in type and the size of the cache block is 32 bytes, although not limitative. Each processor unit 2-i also has a transmitter 7-i and a receiver 8-i for data transfer to and from the network 1.

Each memory unit 3-0, 3-1 has the same structure, and includes a memory bank 11-0, a transmitter 7-4, and a receiver 8-4. The memory bank 11-0 constitutes the main memory. In this embodiment, the memory address is 32 bits, a data read/write unit for the memory bank is 32 bits same as the cache block size, and the memory bank is interleaved in units of 32 bytes.

Each input/output unit 4-0, 4-1 has the same structure, and includes an input/output adapter 13-0, a transmitter 7-6, and a receiver 8-6. The input/output adapter 13-0 converts a signal received from the crossbar switch 1 into a signal receivable by the disk drive unit 10-0-1, 10-0-2, or conversely converts a signal received from the disk drive unit 10-0-1, 10-0-2 into a signal receivable by the crossbar switch 1.

The transmitter 7-4 in the memory unit 3-0, 3-1 and the transmitter 7-6 in the input/output unit 4-0, 4-1 have the same structure as that of the transmitter 7-0 in the processor unit 2-0. Similarly, the receiver 8-4 to 8-7 in the input/output unit and memory unit has the same structure as that of the receiver 6-0 in the processor unit 2-0. In FIG. 1, for the purpose of simplicity, the internal structures of the memory unit 3-1 and input/output unit 4-1 are not shown.

The processor units 2-0 to 2-3, memory units 3-0 and 3-1, input/output units 4-0 and 4-1, and input/output devices such as disk drive units 10-0-1 and 10-1-2 have memory mapped registers (not shown) for the control of these devices similar to a conventional multi-processor system. These registers are mapped in the address space same as that of the main memory. A so-called memory mapped I/O system is incorporated in this embodiment.

In this embodiment, a transmission destination determining circuit is provided in each transmitter 7-i of the processor unit. With this circuit, when an access request to cachable main memory data occurs at one processor unit, the following operation is performed. If the data is not in: the cache of the processor unit, the access request is locally broadcast via the crossbar switch 1 to the processor units having the cache of the main memory among all other processor units and to one memory unit having the data, and is not broadcast to the other memory unit-and all input/output units. With this circuit, the cache consistency control operation can be executed in parallel at each processor unit. The other irrelevant processor units are not supplied with the access request so that they can perform other communications via the crossbar switch 1 in parallel with the access request transfer. In other words, even during access request transfer, the parallel transfer capability of the crossbar switch 1 can be utilized.

When an access request to a memory mapped register of the input/output device occurs at one processor unit, the transmission destination determining circuit of each transmitter 7-i of the processor unit determines the destinations of the access request in the following manner. The access request is locally broadcast via the crossbar switch 1 to all input/output units among the other units, and is not broadcast to the remaining other units. Further, in the input/output device connected to each input/output unit, a circuit is provided for determining whether the input/output device has the register assigned with an address designated by the access request. With these circuits, even if an address actually assigned to the memory mapped register of the input/output device is changed, the memory mapped register with an address designated by the access request can be accessed irrespective of the changed address. Furthermore, since the access request is not sent to the units other than the input/output units, these other units can perform other communications via the crossbar switch 1 in parallel with the access request transfer. In other words, even during access request transfer, the parallel transfer capability of the crossbar switch 1 can be utilized.

If one processor unit issues an access request to the memory mapped register of one of the processor units, memory units, and input/output units, the access request is broadcast to all units via the crossbar switch 1. Therefore, the circuit for determining a destination of an access request can be simplified. Such broadcast affects less the multi-processor system because the number of accesses to these registers is small.

(Structure of Address Space)

Figure 4:
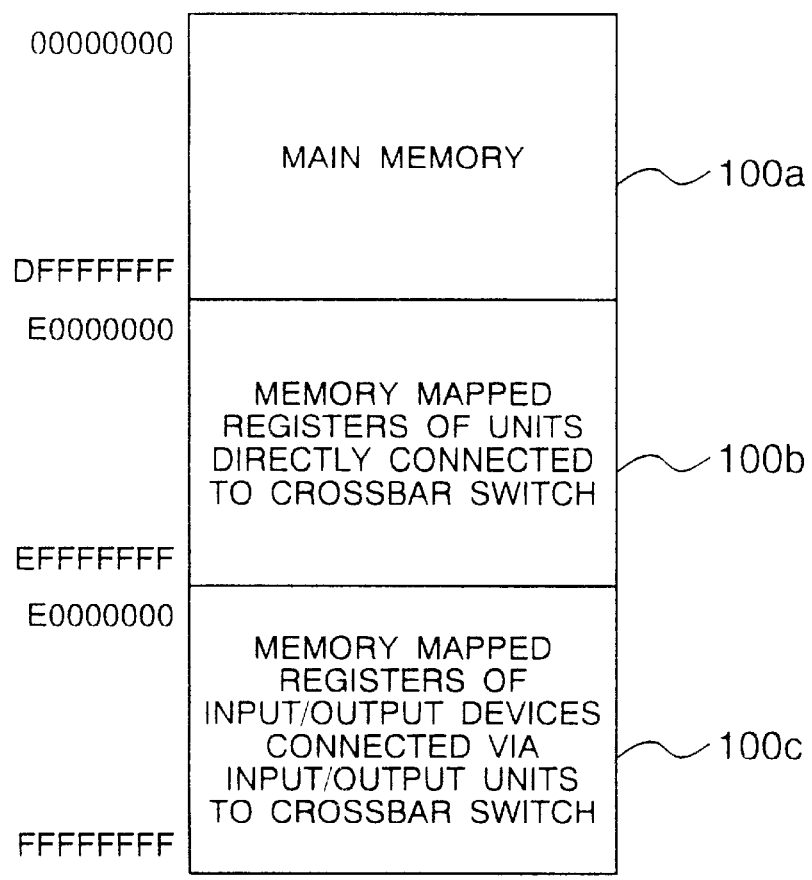
FIG. 4 is a diagram showing the address space used by the first embodiment.

FIG. 4 shows an example of the address space used by this embodiment. In this embodiment, the address space is constituted of 32-bit addresses and has three areas.

A first area 100a from address "00000000" to address "DFFFFFFF" is mapped for the main memory constituted of the memory banks 11-0 and 11-1 of the memory units 3-0 and 3-1. The memory banks 11-0 and 11-1 are interleaved in units of 32 bytes corresponding to the cache block size. For example, the area from address "0" to address "31" is mapped for the memory bank 11-0 and the area from address "32" to address "63" is mapped for the memory bank 11-1. The addresses in the first area is therefore assigned alternately to the memory units 3-0 and 3-1 every 32 bytes. This first area has a cachable area capable of storing data in the cache and a non-cachable area. Setting these areas is performed by a program executed by one of the processor units.

A second area 100b from address "E0000000" to address "EFFFFFFF" is mapped for the memory mapped registers of the processor units 2-0 to 2-3, memory units 3-0 and 3-1, and input/output units 4-0 and 4-1. This second area is a non-cachable area. Mapping of the registers at addresses of this second area is not interleaved as different from the memory banks. Specifically, the second area 100b is divided into a plurality of partial areas having consecutive addresses, and each partial area is assigned to memory mapped registers of the same unit. A plurality of registers in the same unit may be mapped dispersively in a plurality consecutive partial areas in the second area. A plurality of memory mapped registers of different units may be assigned the same address of the second area, for interrupt notice of a plurality Qf processors or other purposes.

Designation of partial areas of each unit may be performed by using known various methods. For example, partial areas for each unit is designated by DIP switch or jumper lines of the unit, or by a fixed signal received by a printed circuit board mounted on each unit, from the back plane board. Alternatively, registers indicating the upper and lower address limits of the partial areas of each unit are provided for each unit, and a service processor sets the addresses through scan-in.

Of the address space, a third area 100c from address "F0000000" to address "FFFFFFFF" is mapped for a plurality of registers of input/output devices such as the disk drive units 10-0-1 and 10-1-2 connected to the input/output adapters 13-0 and 13-1 of the input/output units 4-0 and 4-1, line connection devices (not shown), and the like. This area is also a non-cachable area. Address setting for these registers may be performed by using known various methods as illustratively described above. However, address setting for these memory mapped registers of the input/output devices depends upon the type and number of connected input/output devices. The type and number of input output devices or the input/output units connected to these devices are subject to change by a user before or after running the system. In this case, each time a change occurs, it is necessary to change an address assigned to each memory mapped register.

The operation of the multi-processor system, upon occurrence of an access request to the main memory or memory mapped register at one processor unit, e.g., processor unit 2-0 by the processor, e.g., processor 90-1, changes depending upon the data to be accessed by the access request, as in the following:

(1) cachable data in the main memory;

(2) data in the memory mapped register of the input/output device;

(3) data in the memory mapped register of the processor unit, memory unit, or input/output unit; and (4) non-cachable data in the main memory.

The operation of the system will be described for each of these data.

(System Operation 1) . . . Access to cachable data (Operation 1 of. Processor Unit) . . . Sending CRead transaction The processor 9-0-1 has a processor cache (not shown). In the processor 9-0-1, a hit of this cache for the data designated by the access request is checked. If there is a cache hit, the hit data is accessed by the processor. If there is no cache hit, the processor 9-0-1 sends a read request to the cache controller 5-0 irrespective of whether the access request is a read request or a write request. This read request contains an address of the data to be accessed and a signal indicating that the address is for cachable data. The cache controller 5-0 checks a cache hit of the cache 6-0. If there is a cache hit, the cache controller 5-0 sends the hit block to the processor 9-0-1. The above operations of the processor unit are well known. If there is no cache hit, the cache controller 5-0 generates a CRead (cache read) transaction for the other processor units 2-1 to 2-3 and the memory unit 3-0 or 3-1, and transfers it to the transceiver 7-0.

Figure 2A:
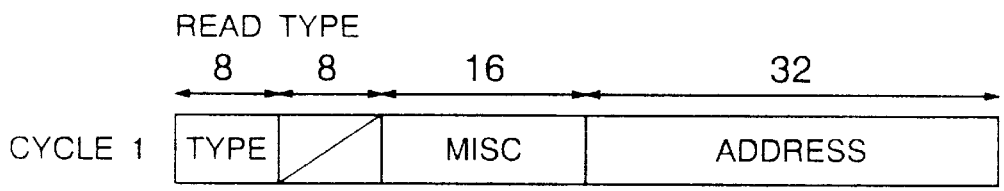
FIGS. 2A to 2C show the formats of transactions before completion used by the first embodiment.

FIG. 2A shows the format of a Read type transaction such as a CRead transaction. This transaction is transferred in one cycle over 8-byte line. The first byte of this transaction is a TYPE field, stored in which is a value indicating that the transaction is a CRead transaction:or other Reed transactions. The second byte is empty in which a port number is embedded later. The third and fourth bytes are a MISC field in which control information used by the unit received the transaction is stored, although this information is not used by the crossbar switch 1. The fifth to eighth bytes are an ADDRESS field in which an access address of the transaction is stored.

Figure 6:
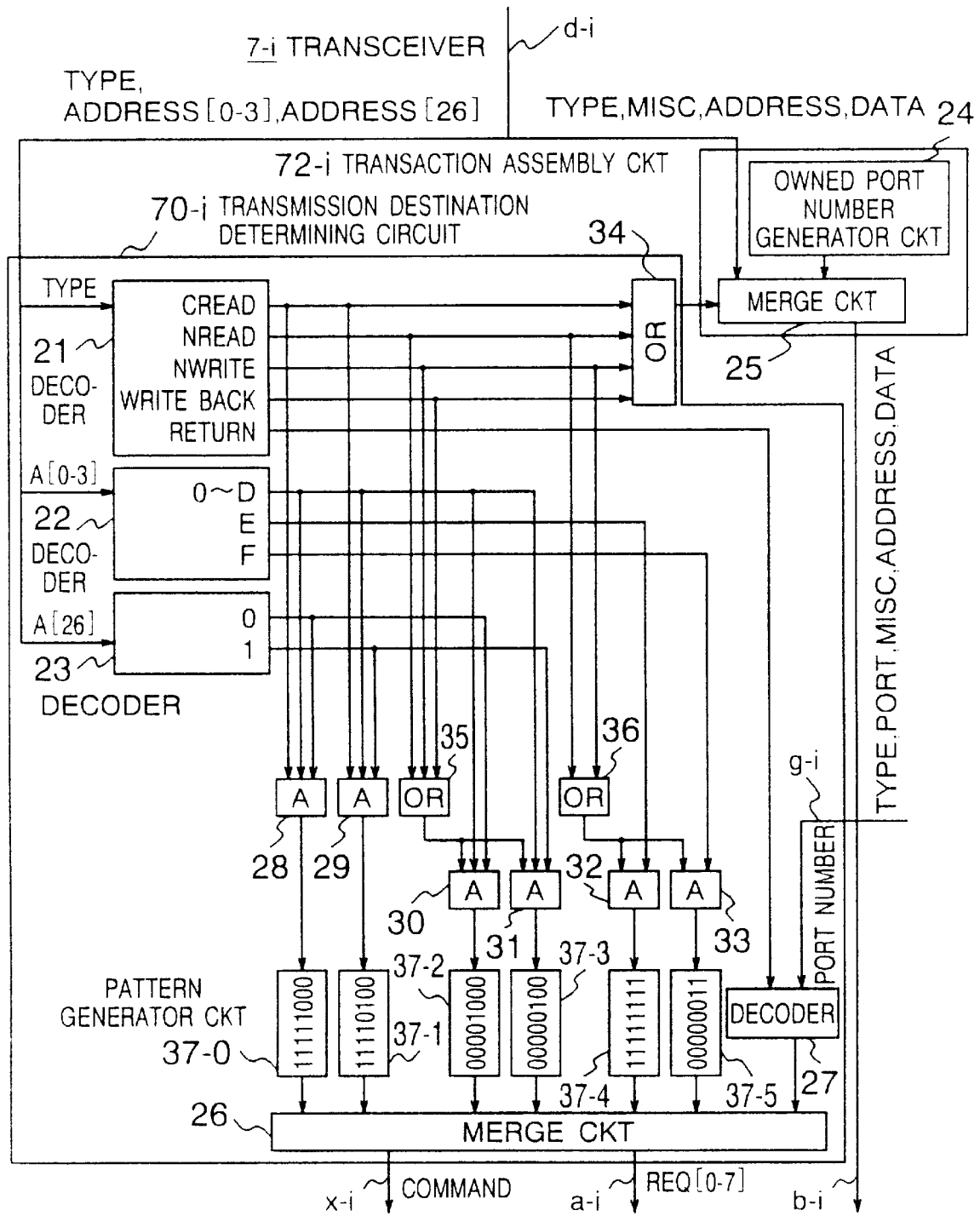
FIG. 6 is a diagram showing the detailed structure of a transmitter of the first embodiment.

FIG. 6 shows the internal structure of the transceiver 7-i (i=0, 1, . . . ). The transceiver has the transmission destination determining circuit 70-i and a transaction assembly circuit 72-i. The transaction assembly circuit 72-i is a circuit for generating a completed transaction which is supplied to the crossbar switch 1. Specifically, reference numeral 24 represents an owned port number generator circuit which generates an owned port number of an input port among a plurality of input ports of the crossbar switch 1 to which the transmitter is connected. This circuit may be a circuit for generating the owned port number by a DIP switch or jumper lines or a circuit such as a register which is scanned in when the system is set up by a service processor (SVP) or the like. A merge circuit 25 embeds the owned port number supplied from the circuit 24 into the second fired of the transaction supplied via a line d-i from the cache controller 5-0 to thereby complete the transaction and supply it via a line b-i to the crossbar switch 1.

The transmission destination determining circuit 70-i determines one or more transmission destinations to which the completed transaction is transmitted. This determination is made in accordance with the type of the transaction and the address contained therein. In the case of the cache read transaction CRead, the transmission destination determining circuit 70-i determines as the transmission destinations all the processor units and one memory unit assigned with an address contained in the transaction.

Figure 5:
FIG. 5 shows the format of an address used by the first embodiment.

FIG. 5 shows the details of the ADDRESS field of the transaction shown in FIGS. 2A to 2C and FIGS. 3A to 3C. Of the 32-bit address field, the 0th and 3rd bits are checked so that the address is determined whether it is the address of one of "main memory", "memory mapped register of the unit directly connected to the crossbar switch" and "memory mapped register of the input/output device connected via the input/output unit to the crossbar switch". It can be determined from the 26th bit value of "1" or "0" whether the access to the "main memory" is an access to the memory unit 3-0 or 3-1.

In FIG. 6, reference numeral 22 represents a decoder for determining from the 0th to 3rd bits whether the address designated by the transaction belongs to which one of the address space areas 100a to 100c shown in FIG. 4. The decoder 22 decodes the contents of the 0th to 3rd bits of the ADDRESS field of the transaction input via the line d-i. Similarly, reference numeral 23 represents a decoder for determining whether the address belonging to the address field 100a indicates which one of the memory units. The decoder 23 decodes the contents of the 26th bit of the ADDRESS field of the transaction input via the line d-i. Reference numeral 21 represents a decoder for determining the type of the transaction. The decoder 21 decodes the TYPE field of the transaction input via the line d-i.

Figures 7, 8:
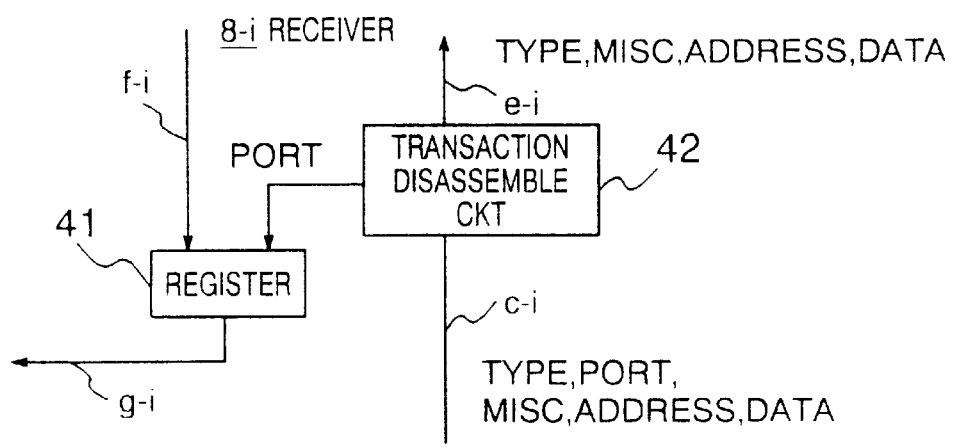
FIG. 7 is a diagram illustrating the operation of the transmitter shown in FIG. 6.
FIG. 8 is a diagram showing the outline structure of a receiver of the first embodiment.

Reference numerals 37-0 to 37-5 represent pattern generator circuits. If an input of "1" is supplied, the pattern generator circuits 37-0 to 37-5 output bit patterns of 8-bit, including "11111000", "11110100", "00001000", "00000100", "11111111", and "00000011". Each bit pattern is constituted of 8 bits corresponding to output ports "0" to "7" of the crossbar switch 1. If the bit has a value "1", the transaction is transmitted to the output port corresponding to the bit. If a pattern has a plurality of bits "1" and "0" like the output pattern of the pattern generator circuit 37-0, the transaction is transmitted in parallel to a plurality of output ports corresponding to the bits "1", i.e., the transaction is locally broadcast. If a pattern has bits of all "1" like the output pattern of the pattern generator circuit 37-4, the transaction is transmitted in parallel to all the output ports, i.e., the transaction is globally broadcast. AND gates 28 to 33 and OR gates 34 to 36 selectively activate the pattern generator circuits 37-0 to 37-7 in accordance with a combination of output values of the decoders 21 to 23. Reference numeral 26 represents a merge circuit for merging a plurality of bit patterns supplied from the pattern generator circuits 37-0 to 37-7. This merge circuit 26 generates a new bit pattern of 8 bits constituted of OR values of corresponding bits of the bit patterns. This new bit pattern is supplied as a transfer request signal REG[0-7] to the crossbar switch 1 via a line a-i. At the same time, a command is supplied via a line x-i to the crossbar switch 1, the command being a timing signal for instructing to pick up the transaction on the line b-1 and the transfer request signal REQ[0-7] on a line a-i. This transfer request signal REQ[0-7] is also constituted of 8 bits corresponding to the eight output ports, and requests the crossbar switch to transfer the transaction to the output ports corresponding to the bits "1". As will be later described in detail, a decoder 27 is used if the transaction decoded by the decoder 21 is a Return transaction which is a response to the transaction transferred from another unit. FIG. 7 is a table explaining the relationship between various input values of the transmission destination determining circuit 70-i and the bit values of the transfer request signal REQ[0-7] generated by this circuit 70-i. In FIG. 7, an asterisk symbol indicates "don't care".

In the case of the cache read transaction CRead, a CRead output of the decoder 21 is "1", and 0 to D outputs of the decoder 22 are "1". An output of the decoder 23 is "1" so that one of the AND gates 28 and 29 outputs "1" and one of the pattern generator circuits 37-0 and 37-1 is activated. For example, if the pattern generator circuit 37-0 is activated, all the processor units and memory unit 3-0 are determined as the transmission destinations. In this embodiment, cachable data is only in the main memory area. Therefore, if the decode 21 decodes the TYPE field and the transaction is determined as the CRead, the decoder 22 is not necessarily required to decode the values of the 0th to 3rd address bits. However, in order to deal with possible program errors, the decode results by the decoder 22 are used for determining the transmission destinations even in the case of the CRead transaction.

(Operation of Crossbar Switch)

The crossbar switch 1 transmits the transaction sent from each unit to one or more destinations specific to the transaction and designated by the transfer request signal supplied from the unit. The crossbar switch of this embodiment is configured so that the same transaction can be transferred in parallel to any combination of an optional number of destinations. Transfer of the transaction to a plurality of destinations can be executed independently. Namely, even if the transaction cannot be transferred to some destination, the transaction can be transferred to other destinations which are ready for reception.

Figure 9:
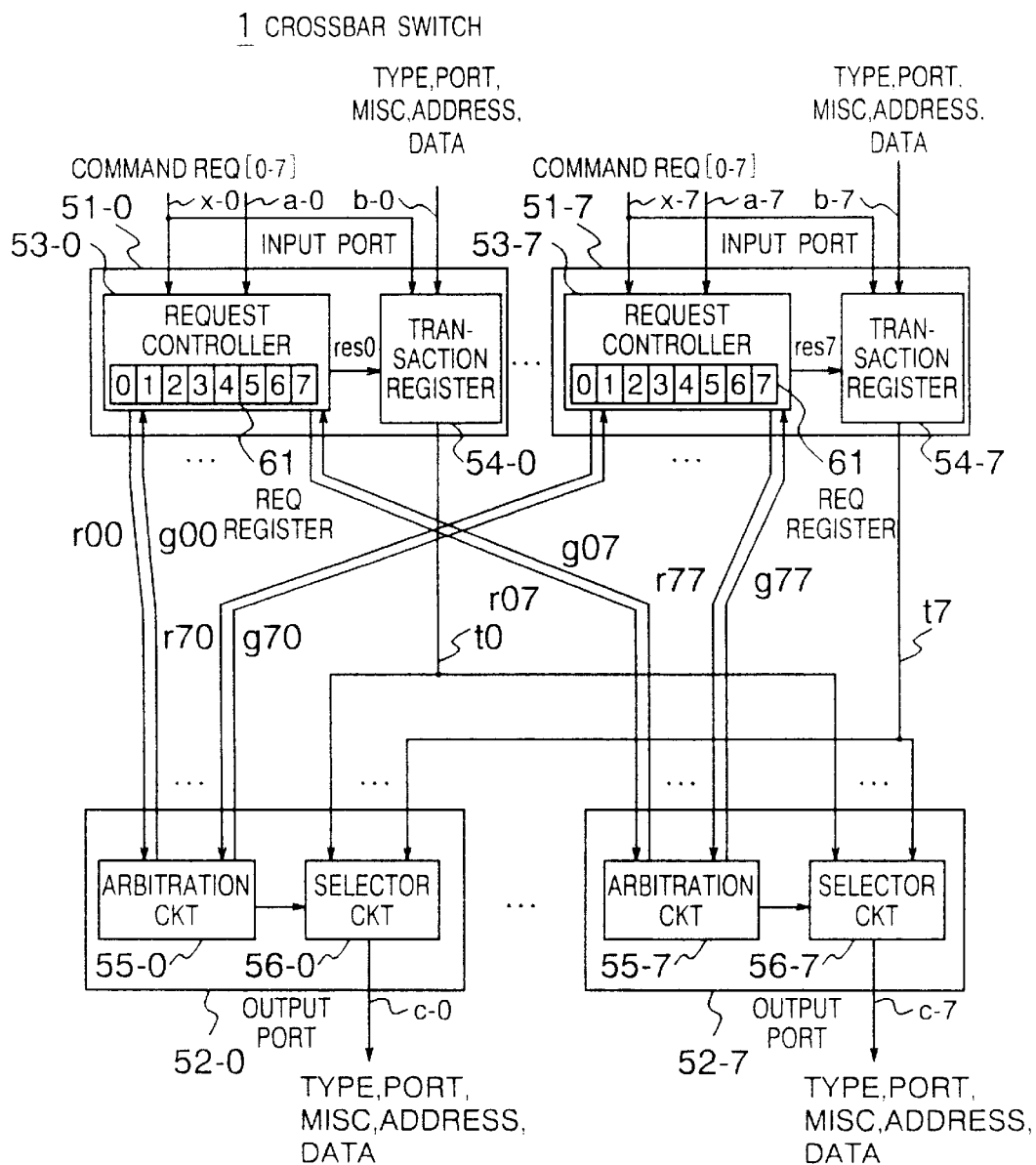
FIG. 9 is a diagram showing the detailed structure of a crossbar switch used by the first embodiment.

FIG. 9 shows the internal structure of the crossbar switch 1. For the purpose of simplicity, only part of the constituents of the crossbar switch 1 is shown in FIG. 9. As shown, the crossbar switch 1 has input ports 51-0 to 51-7 and output ports 52-0 to 52-7. In FIG. 7, combinations of output and input ports having the same number are shown as ports 0 to 7. The input ports 51-0 to 51-7 have request controllers 53-0 to 53-7, respectively, to which the transfer request signal REQ[0-7] is input via lines a-0 to a-7. The request controllers 53-0 to 53-7 have the same internal structure. The input ports 51-0 to 51-7 have transaction registers 54-0 to 54-7, respectively, in which the transaction input via lines b-0 to b-7 is stored. In each input port, the request controller, e.g., request controller 53-0 and transaction register, e.g., transaction register 54-0 are input with the command signal via the line x-0. In response to this command signal, a REQ register 61 and the transaction register 54-0 receive the transfer request signal REQ[0-7] and transaction. The output ports 52-0 to 52-7 have arbitration circuits 55-0 to 55-7 and selector circuits 56-0 to 56-7, respectively. Output signals of the selector circuits 56-0 to 56-7 are transferred to lines c-0 to c-7.

Figure 10:
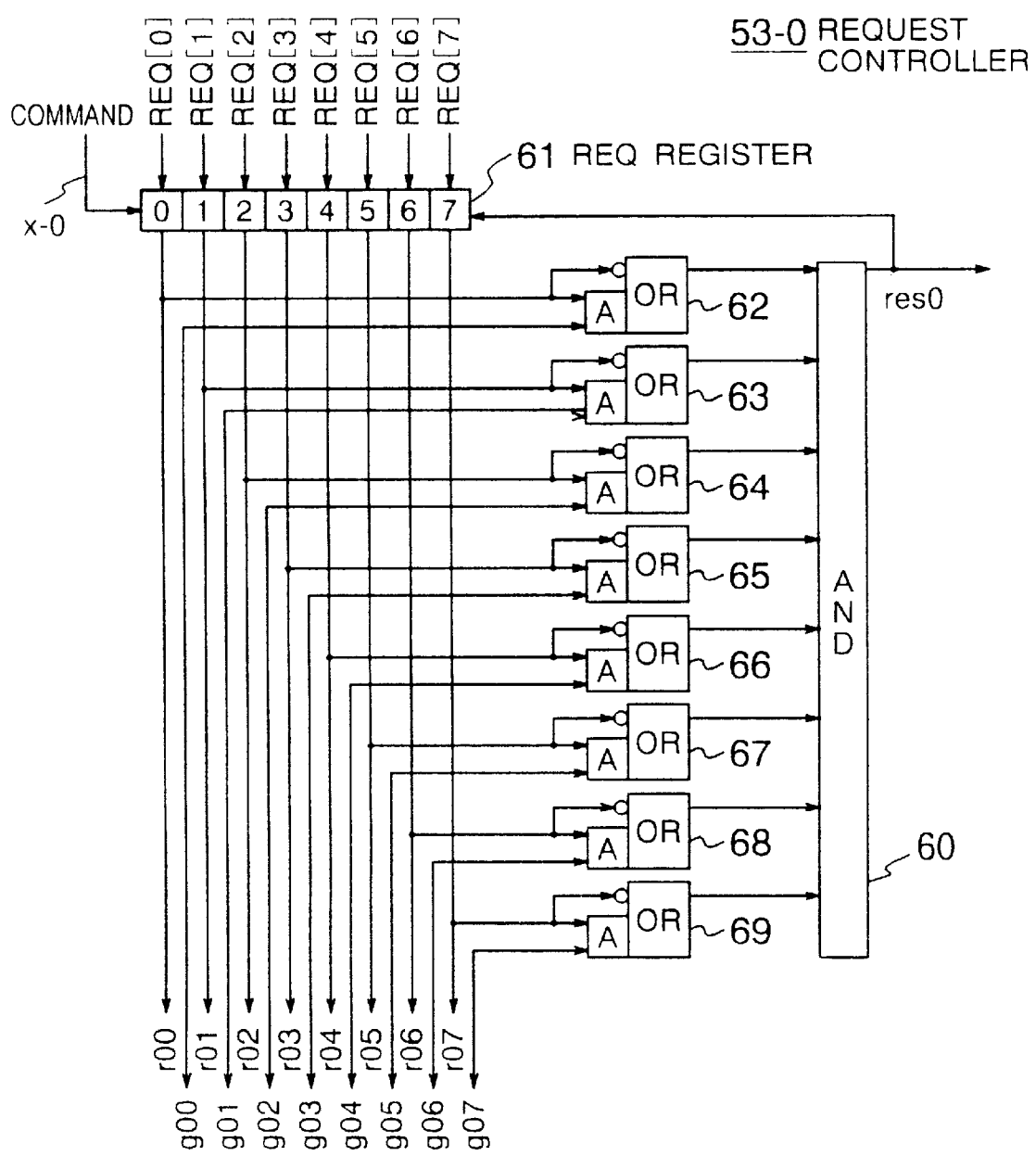
FIG. 10 is a diagram showing the detailed structure of a request controller used by the crossbar switch shown in FIG. 9.

FIG. 10 shows the internal structure of the request controller 53-0 as a representative of the request controllers 53-i (i=0 to 7). In FIG. 10, reference numeral 61 represents the REQ register of an 8-bit width. 0th to 7th bits store REQ[O] to REQ[7] signals input via the line a-0 in response to the command supplied via the line x-0. The 0th to 7th bits output signals r00, r01, r02, r03, r04, r05, r06, and r07, respectively. These signals are supplied to the arbitration circuits 55-0 to 55-7. Reference numerals 62 to 69 represent AND-OR gates. Reference numeral 60 represents an AND gate. The arbitration circuits 55-0 to 55-7 output signals g00, g01, g02, g03, g04, g05, g06, and g07, respectively, which are input to the AND-OR gates 62 to 69. The structures of the request controllers 53-1 to 53-7 and the connections thereof to the arbitration circuits are the same as above.

In the case of the CRead transaction, when the signal REQ[0-7] and transaction are input to the input port 0 via the lines a-0 and b-0, they are stored in the REQ register 61 and transaction register 54-0. The value of the signal REQ[0-7] stored in the REQ register 61 is transferred to the arbitration circuits 55-0 to 55-7 as the arbitration request signals r00 to r07. The transaction stored in the transaction register 54-0 is transferred via a transaction line t0 to the selector circuits 56-0 to 56-7. Of the arbitration circuits 55-0 to 55-7, the arbitration circuit received the signal value "1" as the signals r00 to r07 performs arbitration with the signal r11 and the like sent from the other input ports 51-1 to 51-7. If the arbitration request from the input port 51-0 is satisfied, the signals such as g00 and g01 representative of the arbitration completion are sent to the input port 51-0. The selector circuit of the corresponding output port is instructed to output the transaction input from the line t0 to line c-0 to c-7. The AND-OR gates 62 to 69 and AND gate 60 of the request controller 53-0 detect that all the arbitration circuits received the signal of value "1" as the arbitration request signals have sent the signals g00, g01 and the like representative of the arbitration completion, and thereafter generate a signal res0. This signal is transferred to the REQ register 61 and transaction register 54-0 which in turn clear the contents of the registers to become ready for receiving the next REQ [0-7] and transaction. In the above manner, the transaction can be transmitted to desired units. In the case of the CRead transaction, since the transfer request signal REQ[0-7] is "11111000" or "11110100", the CRead transaction input from the input port 0 is transferred in parallel to the output ports 0 to 4 or output ports 0 to 3 and 5.

As seen from the above operation of the embodiment, as in the case of the transaction CRead, the transaction is not broadcast to all units, but it is locally broadcast to limited units (all the processor units and one of the memory units). Therefore, during this local broadcast of a first transaction, the crossbar switch 1 can transfer another transaction from a unit other than the first transaction transmitted unit (in the above example, the processor unit 2-0) to other units to which the first transaction is not broadcast. During the local broadcast of a transaction, particularly the CRead transaction, a transaction requesting an access to an input/output device connected to the input/output unit 4-0 or 4-1 of the network can be transferred. In this embodiment, therefore, the parallel transfer capability of the network can be efficiently utilized. Furthermore, the transfer request signal REQ[0-7] is constituted of bits corresponding to the output port signals, and each bit is supplied to the arbitrary circuit of the corresponding output port. Therefore, in the network of this embodiment, it is easy to control parallel transfer of the same transaction to a combination of an optional number of destinations. Still further, transfer of the same transaction is controlled depending upon arbitration results of the transfer request bit at each output port and not at other output ports. Therefore, even if transaction arbitration does not succeed at one output port, the transaction can be transferred to the other output ports whose arbitration has succeeded. The same transaction can therefore be transferred to a plurality of output ports at high speed as a whole.

(Operation 2 of Processor Unit) . . . Response to CRead Transaction

As the crossbar switch 1 transmits a transaction to each processor unit, the processor unit receives this transaction and processes it in accordance with the transaction type and the address value contained in the transaction.

FIG. 8 shows the internal structure of the receiver 8-i (i=0, 1, . . . ). In FIG. 8, a transaction disassembly circuit 42 stores the contents of a PORT field of the transaction input from the crossbar switch 1 via the line c-1, into a PORT register 41. The contents of the field other than the PORT field of the transaction input via the line c-1 are sent to a cache controller 5-i via a line e-i. As will be later described, if the received transaction is a Return transaction, the PORT field is not used and there is a possibility that an optional number is stored in this field. In this case, however, the transaction disassembly circuit 42 stores this value in the PORT register 41. The cache controller 5-i clears the contents of the PORT register 41 via a line f-i each time a transaction is received at the transaction disassembly circuit 42.

Figure 2B:
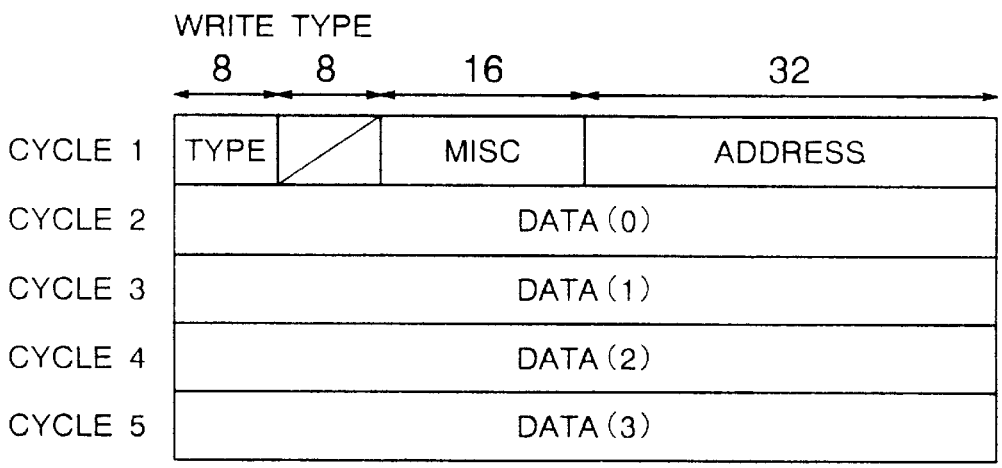
Figure 2C:
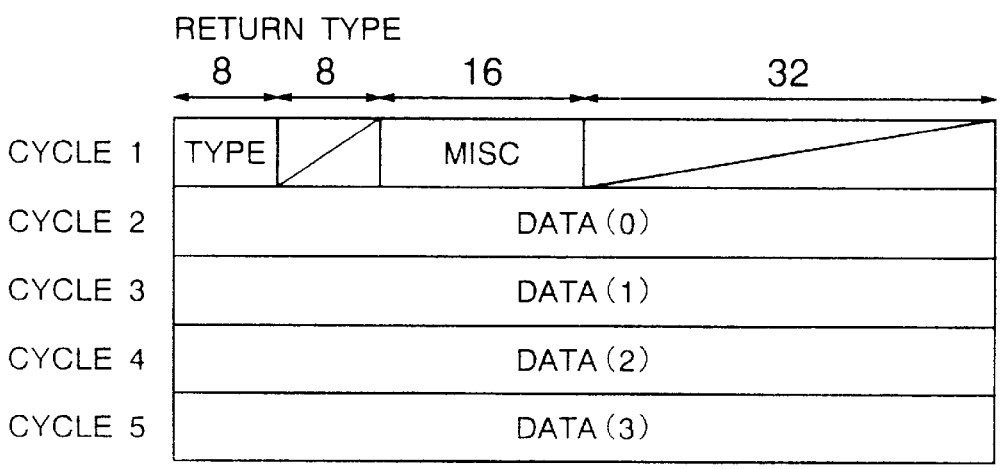

In the case of the CRead transaction, the cache controller 5-i of each processor unit performs cache consistency control. Many cache consistency controls may be used. In this embodiment, a relatively simple method described hereinunder is used. A cache hit of, for example, the cache 6-1 of the processor unit 2-1, is checked for the cache block designated by the address in the CRead transaction. If there is a cache hit, it is checked whether the block was updated after it was read from the main memory (whether the block is dirty or not). Therefore, the cache controller 5-i has status information of each cache block whether the block is dirty or not. If there is no cache hit, a reset signal is supplied via a line f-0 to the PORT register 41 of the receiver 8-1 to clear it. The receiver 8-1 becomes therefore ready for receiving the next transaction and stands by without performing any operation. If there is a cache block hit, it is checked from the status information (dirty or clean) stored for the block whether it is dirty or not. If the block was not updated after it was read from the main memory (i.e., the block is clean), the processes same as without a cache hit are executed. However, if there is a cache hit and the hit block is dirty, in order to transfer this block to the CRead transaction transmitting processor unit, in this example, processor unit 2-0, a Return transaction having the format shown in FIG. 2C is generated and transferred to the transmitter 7-1 over a plurality of cycles. The hit block in the cache 6-1 is made invalid.

In the transmitter 7-1, the decoder 27 has been supplied with the port number in the CRead transaction received from the receiver 8-1 via a line g-i. In this example, this port number corresponds to the CRead transaction transmitted processor unit. The decoder 21 decodes the transaction and the decoder 27 outputs one of bit patterns, including "10000000", "01000000", "00100000", "00010000", "00001000", "00000100", "00000010", and "00000001" respectively corresponding to the transaction transmitted port numbers 0 to 7 supplied via the line g-i, to the marge circuit 26. In this example, the transaction transmitted processor unit is the processor unit 2-1 and the port number of the crossbar switch assigned to the processor unit is 0. Therefore, the decoder 27 generates the bit pattern "10000000". This bit pattern indicates that the enerated Return transaction is output to the port number 0 of the crossbar switch 1. The crossbar switch 1 transfers this transaction to the CRead transaction transmitted processor unit 2-0. The cache controller 5-0 writes the block contained in the transaction into the cache 6-0 and transfers it to the processor 9-0-1 or 9-0-2 which issued the read request previously. This processor writes the block in its cache, cuts a predetermined data portion from the block, and sends the cut data portion to its processing circuit.

(Operation of Memory Unit)

In the memory unit, e.g., memory unit 3-0, the memory bank 11-0 does not respond to the received CRead transaction if some processor unit detects that there is a cache hit and the hit block is dirty. If not, it responds to the received CRead transaction and generates a Return transaction. This transaction is returned to the processor 2-0 in the same manner as the aforesaid case where the processor unit 2-1 transfers the transaction to the processor unit 2-1. The operation of the memory unit can be considered as part of the other operations of cache consistency control.

In the above manner, an access request to cachable data can be locally broadcast to all the processor units and only the associated memory unit via the crossbar switch. Data stored in the cache or memory unit can be transmitted to the data access requested processor unit, and consistency control among a plurality of caches can be executed.

Figure 3A:
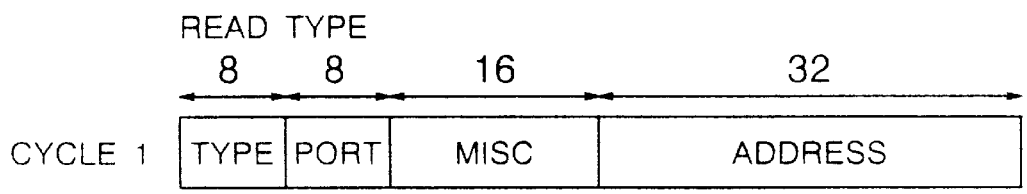
FIGS. 3A to 3C show the formats of the transactions shown in FIGS. 2A to 2C after completion.
Figure 3B:
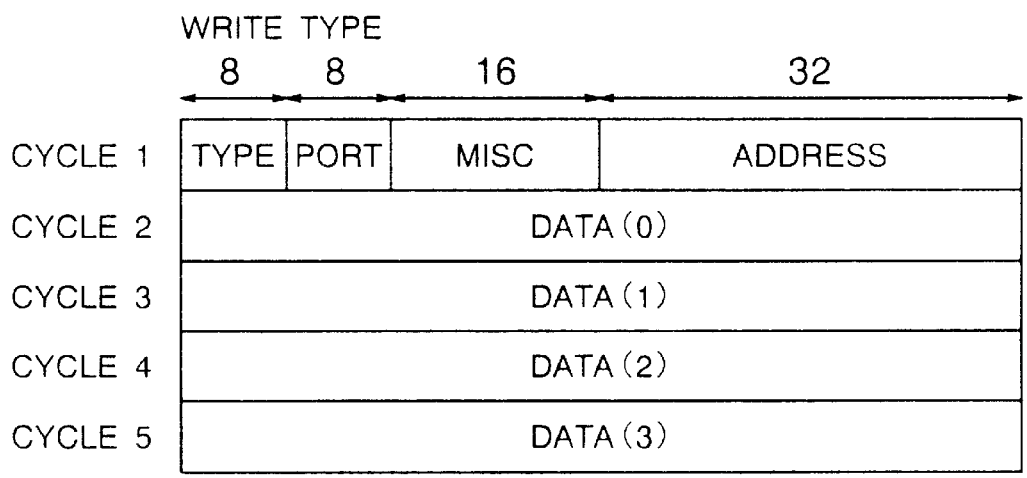
Figure 3C:
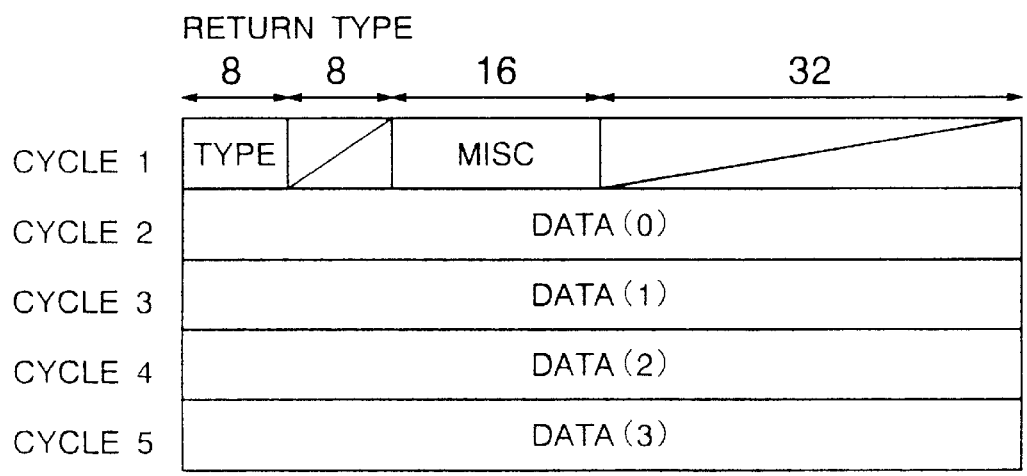

(System Operation 2) . . . Access to Memory Mapped Register of Input/Output Device The area 100c shown in FIG. 4 is assigned to memory mapped registers. In this embodiment, it is assumed that data stored in all the memory mapped registers assigned this area 100c is non-cachable. Therefore, in order to read the data stored in any one of the memory mapped registers, a non-cache read (NRead) transaction is used in place of the CRead transaction. The format of the NRead transaction generated by the cache controller, e.g., cache controller 5-0 and the format of the NRead transaction completed by the transmitter, e.g., transmitter 7-0 are the same as that of the CRead transaction, and only the values in the Type fields are different. In writing data into the memory mapped register, a non-cache write (NWrite) transaction is used. The format of the NWrite transaction generated by the cache controller, e.g., cache controller 5-0 and the format of the NWrite transaction completed by the transmitter, e.g., transmitter 7-0 are shown in FIGS. 2B and 3B, respectively, the data to be written being stored in the NWrite transaction.

Data stored in all the memory mapped registers assigned this area 100c is non-cachable. Therefore, in accessing any one of the memory mapped registers, the NRead or NWrite transaction is transferred to the input/output unit 4-0 or 4-1 connected to the input/output device 10-0-1 or the like having the memory mapped register. In this embodiment, however, in accessing the memory mapped registers, the NRead or NWrite transaction is transferred to all the input/output units 4-0 and 4-1, and it is checked whether the resistor assigned an address designated by the transaction is contained in the input/output device connected to each unit. The reason for this is as follows.

The input/output devices connected to the input/output units 4-0 and 4-1 are changed in some times after the multi-processor of this embodiment is shipped, to replace them or add other devices. If a circuit for determining the input/output unit for receiving the transaction is provided on the side of each transmitter 7-0 to 7-7, it becomes necessary for this circuit to be controlled by a DIP switch or the like each time mapping of the memory mapped registers to the address area is changed because of the configuration change of input/output devices, or it becomes necessary for the circuit to be initialized by software each time the operating system is set up. The former method is associated with a difficulty of changing the configuration by a user. The latter method is associated with a problem that a program for initializing the circuit is required to be added to the operating system. These problems can be solved by transferring the transaction to all the input/output units as described above. The memory mapped registers mapped to the address area 100c are mainly used for setup or status display of the input/output devices or the like, and have a tendency that an access occurrence frequency is smaller than usual memory accesses. Therefore, even if the transaction is transferred (locally broadcast) to the units having a possibility of receiving the transaction, i.e., all the input/output units 4-0 and 4-1, the system performance is not so much degraded. A circuit for determining transaction destinations can be more simplified if the transaction is transferred to all the input/output units 4-0 and 4-0, than if the transaction is transferred to a specific input/output unit. Furthermore, since the transaction is not transferred to the processor units or the like, the parallel transfer capability of the crossbar switch is lowered less.

Determining transaction destinations is performed in the following manner. In the transmission destination determining circuit 70-i of the transmitter 7-i shown in FIG. 6, the decoder 21 decodes the NRead or NWrite transaction, and when the decoder 22 detects that the address in the transaction is mapped to the address area 100c, the OR gate 36 and AND gate 33 activate the pattern generator circuit 37-5. This circuit 37-5 generates a pattern while designating all the input/output units as the transaction destinations. As a result, this transaction is sent to the input/output units 4-0 and 4-1.

Next, the operations of the input/output unit 4-0 and disk drive unit 10-0-1 will be described. In the input/output unit 4-0, upon reception of the NRead or NWrite transaction supplied from the crossbar switch 1 via a line c-6, the receiver 8-6 transfers the contents of the fields other than the PORT number field of the transaction, to the input/output adapter 13-0 via a line e-6.

Figure 16:
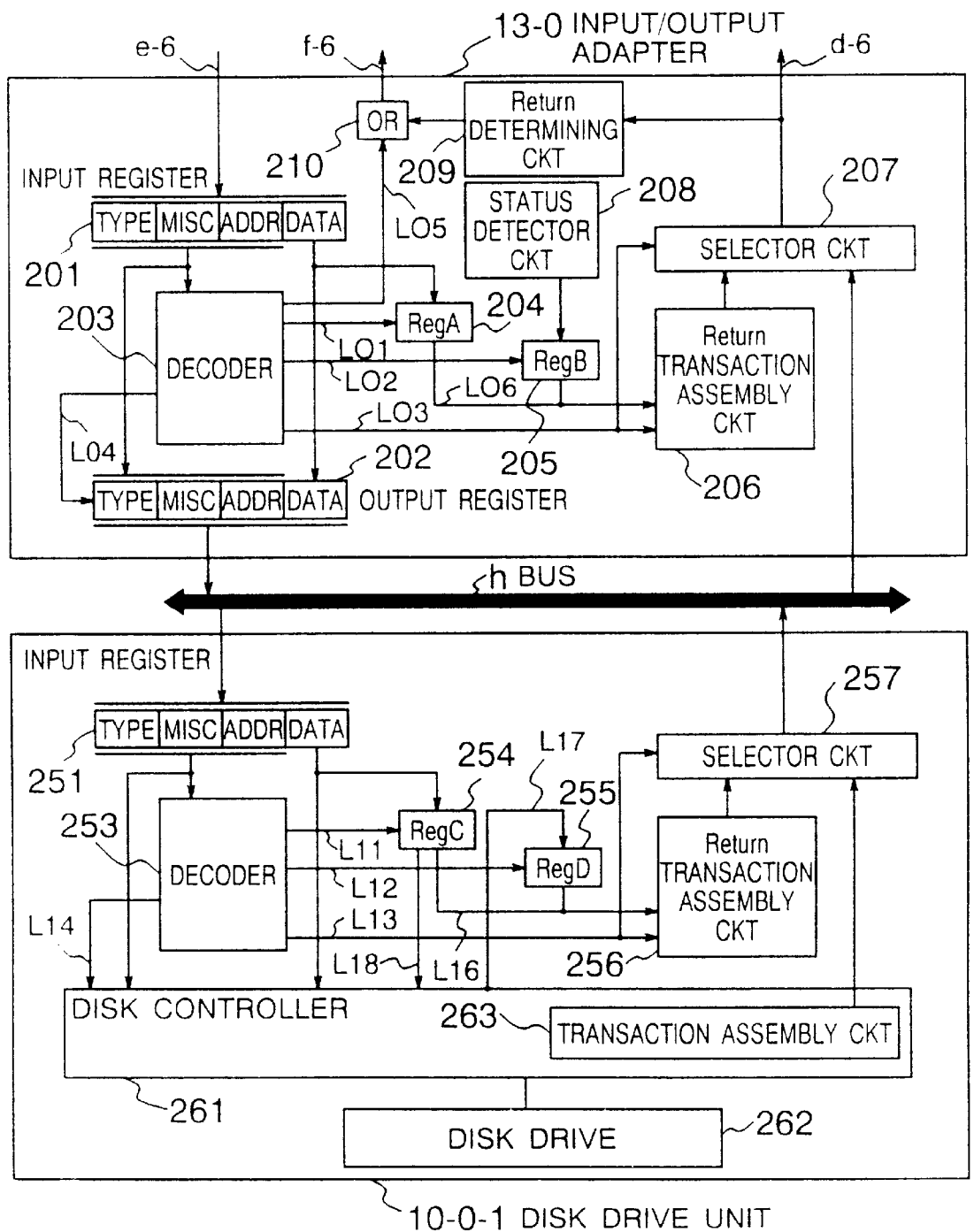
FIG. 16 is a diagram showing the outline structure of an input/output unit and an input/output device used by the first embodiment.

FIG. 16 shows the structures of the input/output adapter 13-0 and disk drive unit 10-0-1. The input/output adapter 13-0 stores the contents of the fields other than the PORT field of the transaction input via the line e-6, into an input register 201. Of the stored values, the data in the TYPE, MISC, and ADDRESS fields of the transaction is input to a decoder 203 which determines the type and access destination of the transaction.

If the input transaction is an NRead or NWrite transaction containing the address of a memory mapped register of the input/output device such as the disk drive unit 10-0-1 connected to a bus h, or if it is a Return transaction responsive to the NRead transaction generated by a transaction assembly circuit 263 of the input/output device and transferred to the memory unit 3-0 or 3-1 via a selector circuit 257, bus h, and selector 207, then the decoder 203 supplies a signal to an output register 202 via a line L04 to transfer the values stored in the input register 201 to the output register 202 and output them to the bus h.

Reference numeral 251 represents an input register, and reference numeral 253 represents a decoder. Reference numerals 254 and 255 represent memory mapped registers RegC and RegD of the disk drive unit 10-0-1. The value set to the register RegC 254 controls the operation of the disk drive unit 10-0-1. A plurality of registers RegC may be used although one register is shown in FIG. 16. A signal line L18 is illustratively shown which is used for controlling the operation of the disk drive unit 10-0-1 in accordance with the value set to the register RegC. The register RegD 255 stores data representative of the internal status of the disk drive unit 10-0-1. A plurality of registers RegD may be used although one register is shown in FIG. 16. A signal line L17 is illustratively shown which is used for inputting data representative of the internal status. Reference numeral 256 represents a Return transaction assembly circuit, and reference numeral 257 represents the selector circuit.

Reference numeral 261 represents a disk controller, reference numeral 262 represents a disk drive, and reference numeral 263 represents the transaction assembly circuit. The disk controller 261 includes a disk drive control circuit and a DMA (direct memory access) control circuit. The disk controller 261 writes received data into the disk drive 262 or outputs a transaction generated by the transaction assembly circuit 263 using data read from the disk drive 262. The disk controller can be configured by well known techniques.

As the values stored in the output register 202 are output to the bus h, the disk drive unit 10-0-1 stores them in the input register 251. Of the stored values, the data in the TYPE, MISC, and ADDRESS fields of the transaction is input to the decoder 253 which determines the type and access destination of the transaction.

If the input transaction is an NRead transaction designating the address of the register RegD 255, the decoder 253 supplies a read signal to the register RegD 255 via a line L12. Then, the register RegD 255 outputs the value stored therein to the Return transaction assembly circuit 256 via a line L16. The decoder 253 also supplies a signal via a line L13 to the Return transaction assembly circuit 256 and selector circuit 257. The Return transaction assembly circuit 256 generates a Return transaction by using the value read from the register RegD 255 and outputs it to the bus h. This transaction is output via the selector circuit 207 to the line d-6.

If the input transaction is an NWrite transaction designating the address of the register RegC 254, the decoder 253 sends a write signal via a line L11 to the RegC 254 which in turn holds the write data stored in the input register 251.

If the input transaction is a Return transaction responsive to the NRead transaction generated by the transaction assembly circuit 263 of the disk controller 261 and transferred to the memory unit 3-0 or 3-1 via the selector circuit 257, bus h, and selector 207, then the decoder 253 supplies a signal to the disk controller 261 via a line L14 to make the disk controller 261 read the values stored in the input register 251.

(System Operation 3) . . . Access to Other Memory Mapped Registers

These registers are contained in this embodiment in the processor units 2-0 and 2-1, memory units 3-0 and 3-1, and input/output units 4-0 and 4-1.

These registers are assigned the address area 100b shown in FIG. 4. In this embodiment, it is assumed that data stored in all the memory mapped registers assigned this area 100b is non-cachable. Therefore, in order to access the data stored in any one of the memory mapped registers, an NRead transaction or NWrite transaction is used. Data stored in all the memory mapped registers assigned this area 100b is non-cachable. Therefore, in accessing any one of the memory mapped registers, the NRead or NWrite transaction is transferred to the unit containing the subject register. In this embodiment, however, in accessing the memory mapped registers, the NRead transaction is transferred to all the processor units 2-0 and 2-1, memory units 3-0 and 3-1, and input/output units 4-0 and 4-1. The reason for this is as follows.

Most of the memory mapped registers assigned the address area 100b are those registers used for initialization immediately after power-on of the multi-processor system or for storing a log of failure occurrence states of the multi-processor system, and are hardly accessed during the normal system operation. Therefore, there is no danger of lowering the system performance even if the transaction is transferred to the units having a possibility of receiving the transaction, i.e., to all the units, without transferring it to a specific unit. A circuit for determining a specific unit to which a transaction is transferred, is not therefore used to thereby reduce a hardware amount. The same address in this area 100b may be assigned to a plurality of registers of different units. In this case, the transaction destination determining circuit becomes complicated correspondingly. In this embodiment, therefore, the hardware amount can be reduced also in such a case.

Determining transaction destinations is performed in the following manner. In the transmission destination determining circuit 70-i of the transmitter 7-i shown in FIG. 6, the decoder 21 decodes the NRead or NWrite transaction, and when the decoder 22 detects that the address in the transaction is mapped to the address area 100b, the OR gate 36 and AND gate 32 activate the pattern generator circuit 37-4. This circuit 37-4 generates a pattern while designating all of the processor units 2-0 and 2-1, memory units 3-0 and 3-1, and input/output units 4-0 and 4-1 as the transaction destinations. As a result, this transaction is sent to all these units by the crossbar switch 1.

The operation of each unit upon reception of a broadcast transaction will be described with reference to FIG. 16 by using the input/output unit 4-0 as an example.

Reference numerals 204 and 205 represent memory mapped registers RegA and RegB of the input/output adapter 13-0. The value set to the register RegA 204 controls the operation of the input/output adapter 13-0. A plurality of registers RegA may be used although one register is shown in FIG. 16. For the purpose of simplicity, signal lines and circuits for controlling the operation of the input/output adapter 13-0 in accordance with the value set to the register RegA are not shown in FIG. 16. The register RegB 205 stores an output of a status detector circuit 208 which detects the internal state of the input/output adapter 13-0. A plurality of registers RegB may be used although one register is shown in FIG. 16. Reference numeral 206 represents a Return transaction assembly circuit, reference numeral 207 represents a selector circuit, reference numeral 209 represents a Return determining circuit, and reference numeral 210 represents an OR gate.

In the input/output adapter 13-0, the data in the fields other then the PORT field of the transaction input via the line e-6 is stored in the input register 201. Of the stored values, the data in the TYPE, MISC, and ADDRESS fields of the transaction is input to a decoder 203 which determines the type and access destination of the transaction.

If the input transaction is an NRead transaction designating the address of the register RegB 205, the decoder 203 supplies a read signal to the register RegB 205 via a line L02. Then, the register RegB 205 outputs the value stored therein to the Return transaction assembly circuit 206 via a line L06. The decoder 203 also supplies a signal via a line L03 to the Return transaction assembly circuit 206 and selector circuit 207. The Return transaction assembly circuit 206 generates a Return transaction by using the value read from the register RegB 205 and outputs it to a line d-6.

If the input transaction is an NWrite transaction designating the address of the register RegA 204, the decoder 203 sends a write signal via a line L01 to the RegA 204 which in turn holds the write data stored in the input register 201.

If the decoder 203 determines that it is not necessary to generate a Return transaction because the input transaction is not an NRead transaction in the above operation, then it supplies a reset signal via a line L05, OR gate 210, and line f-0 to a PORT register 41 of the transceiver 7-6 to clear it. The receiver 8-6 becomes therefore ready for reception of the next transaction. If it is necessary to generate a Return transaction, the Return determining circuit 209 detects the Return transaction transferred via the line d-6 to the transmitter 7-6, to clear the PORT register 41 of the transmitter 7-6 via the OR gate 210 and a line f-6. With such a control, it can be ensured that the transmission destination of the Return transaction is stored in the PORT register 41 of the transmitter 7-6 when the Return transaction is generated.

The operations of memory mapped registers and associated circuits contained in the cache controller 5-0 and the like and the memory banks 3-0 and 3-1 and the like of the other units are similar to the above operations, and so the description thereof is omitted.

(System Operation 4) . . . Access to Non-cachable Data in main storage

In this embodiment, also in accessing this data, the NRead or Nwrite transaction is used. Since the non-cachable data in the main memory is stored in one of the main memory units, the transmitter 7-i of each processor unit determines one destination port number in accordance with the address in the transaction. Specifically, the decoders 21, 22, and 23, OR gate 35, and AND gates 30 and 31 shown in FIG. 6 activate one of the pattern generator circuits 37-2 and 37-3. For example, assuming that the pattern generator 37-2 is activated, the memory unit 3-0 becomes the destination of the NRead transaction. Upon reception of the transaction, this memory unit sends a Return transaction containing data requested by the NRead transaction to the requested processor unit. In writing non-cachable data into the main memory, an NWrite transaction is used.

(System Operation 5) . . . Other Transactions

If it becomes necessary to write back a cache block in any one of the processor units, a write-back (WriteBack) transaction is used. The format of this transaction is the same as that of the NWrite transaction, and the system operation during execution of this transaction is the same as writing non-cachable data in the main memory described with the above-described System Operation 3.

The first embodiment described above may be modified into various ways.

(1) In the first embodiment, although four processor units, two memory units, and two input/output units are used, the number of these units may be set arbitrary.

(2) In the first embodiment, although store-in cache control is used for the control methods of the cache controllers 5-0 to 5-3, this invention can be readily applied to caches of other types. Although the five types of transactions have been described, the invention is readily applicable to six or more types of transactions.

(3) In the first embodiment, all the transmitters 7-0 to 7-7 have the same structure. However, since the memory units 3-0 and 3-1 will not generate the CRead, NRead, NWrite, and WriteBack transactions, the circuit portions of the transmitters 7-4 and 7-5 corresponding to the operations of the four types of transactions may obviously be deleted. Similarly, since the input/output units 4-0 and 4-1 will not generate the CRead and WriteBack transactions, the circuit portions of the transmitters 7-6 and 7-7 corresponding to the operations of the two types of transactions may obviously be deleted.

(4) In the first embodiment, the processor units 2-0 to 2-3 may be implemented on a single printed circuit board or each may be implemented on a single LSI. If the processor unit is mounted on a single LSI, the processor unit LSI can be directly connected to the crossbar switch 1 so that a compact multi-processor can be realized. It is easy to use a conventional bi-directional signal line as the lines b-i and c-i and use it time divisionally. In this case, the processor unit can be connected to the crossbar switch via the line a-i and the line realizing the lines b-i and c-i in a time division way so that the processor unit can be made of an LSI which is inexpensive and has a smaller number of pins. The number of signal lines a-i can be reduced by properly encoding the REQ[0-7] signal because the. patterns don't include all the combinations of 8 bits.

<2nd Embodiment>

An object of the second embodiment is to provide an inexpensive multi-processor system of the first embodiment by forming the crossbar switch by a plurality of bit-sliced LSIs of the same structure. In the following description, the different points of the second embodiment from the first embodiment will be mainly described.

Figure 11:
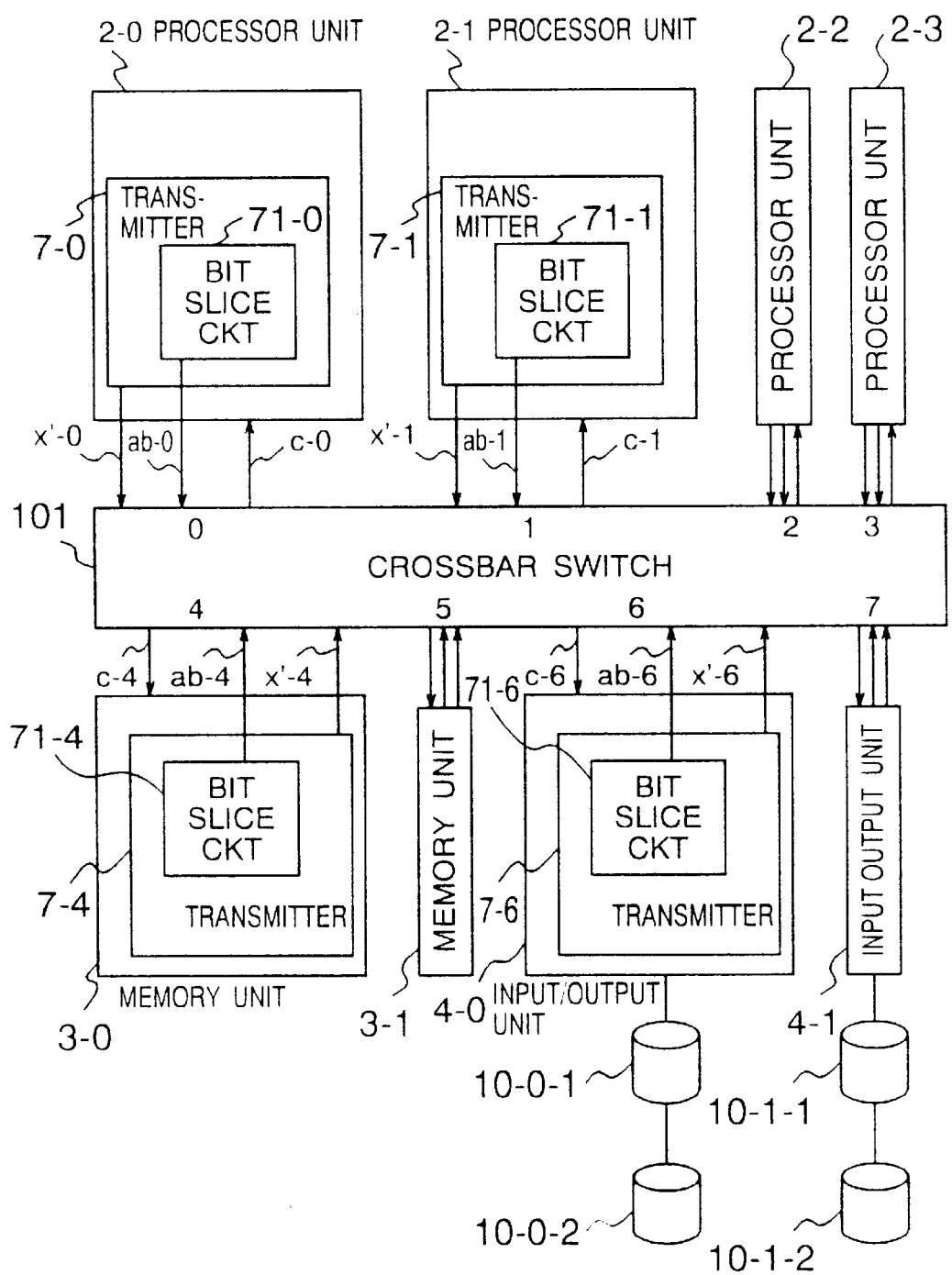
FIG. 11 shows the overall structure of a multi-processor system according to a second embodiment of the invention.
Figure 13:
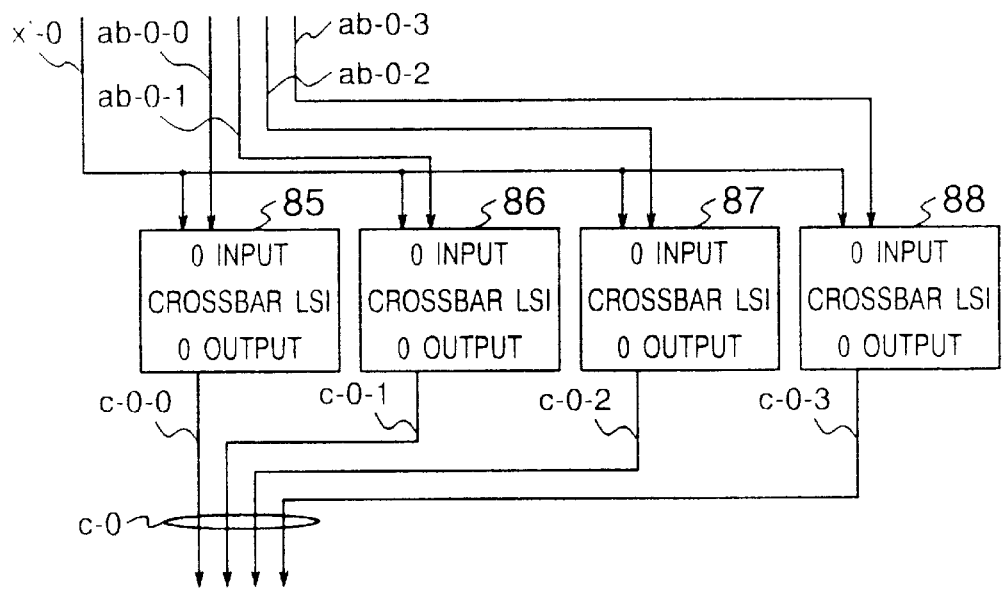
FIG. 13 is a diagram illustrating LSI division of the crossbar switch used by the second embodiment.

As shown in FIG. 11, in the multi-processor system of the second embodiment, the transmitter of each unit is provided with a bit slice circuit 71-0, 71-1, . . . , and the crossbar switch is formed as shown in FIG. 13 by a plurality of LSIs 85 to 88 of the same structure.

Figure 12:
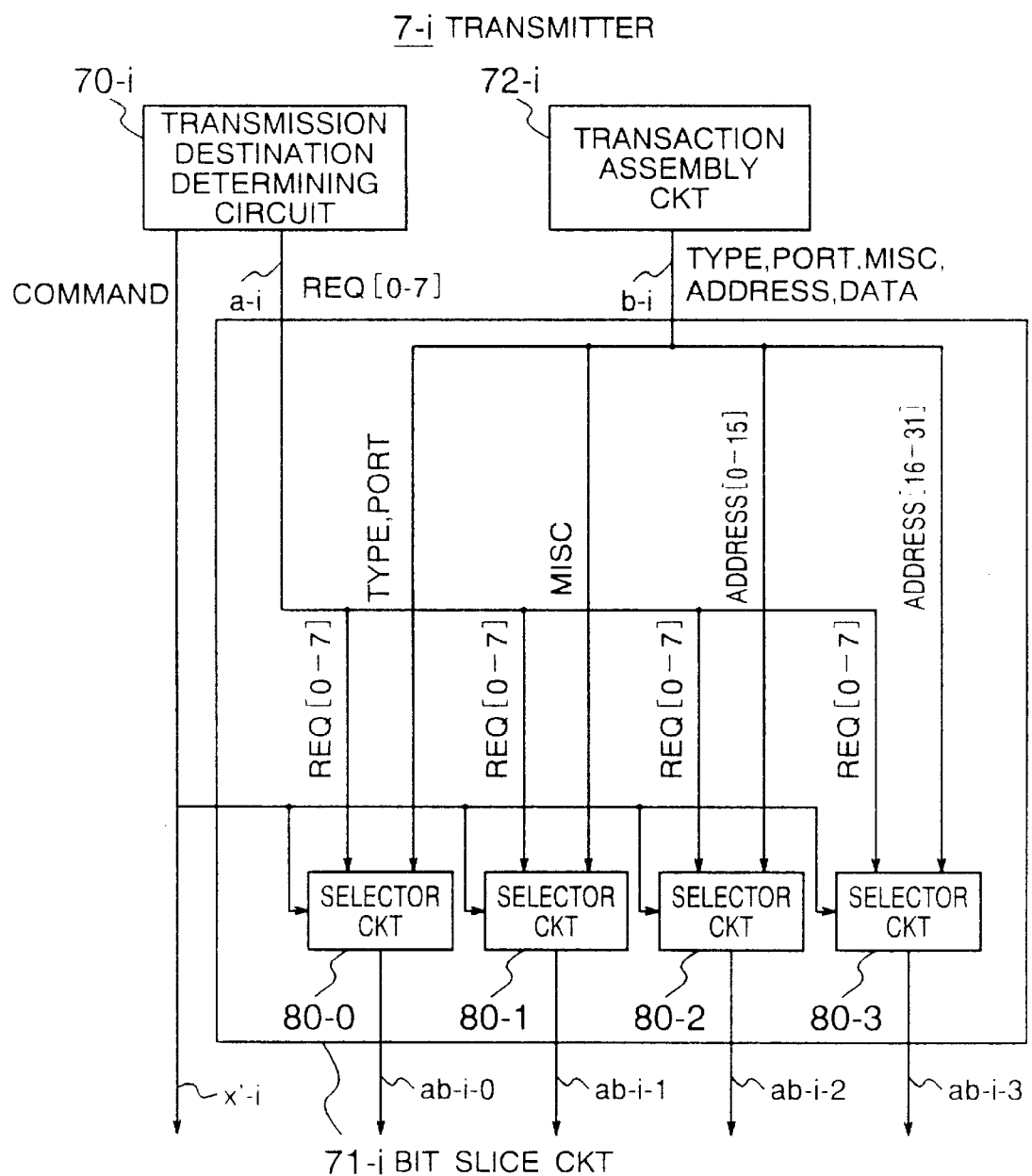
FIG. 12 is a diagram showing the detailed structure of the transmitter used, by the second embodiment.

As shown in FIG. 12, the transmitter 7-i (i=0, 1, . . . ) is constituted of a transmission destination determining circuit 70-i, a transaction assembly circuit 72-i, and a bit slice circuit 71-i. The bit slice circuit 71-i is constituted of selector circuits 80-0 to 80-3. Inputted to each selector circuit 80-0 to 80-3 are a REQ[0-7] signal output from the transmission destination determining circuit 70-i via a line a-i and two bytes of the transaction of 8-byte width output from the transaction assembly circuit 72-i via a line b-i. By taking the READ type transaction shown in FIG. 3A as an example, the selector circuit 80-0 is input with two bytes of the TYPE and PORT fields, the selector circuit 80-1 is input with two bytes of the MISC field, the selector circuit 80-2 is input with upper two bytes of the ADDRESS field, and the selector circuit 80-3 is input with lower two bytes of the ADDRESS field. The transaction assembly circuit 72-i is the same as the first embodiment, whereas the transmission destination determining circuit 70-i is different from the first embodiment in that a command on a line x'-i different from the first embodiment command on the x-i is output.

Figure 14:
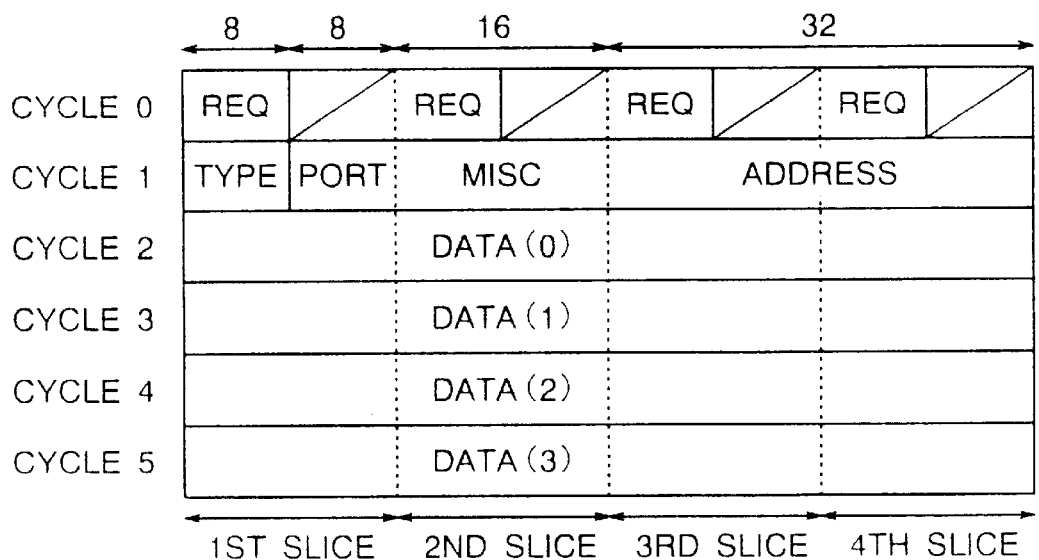
FIG. 14 shows the format of a bit sliced transaction used by the second embodiment.

FIG. 14 illustrates four signals output from the selector circuit 80-0 to 80-3 of the bit slice circuit 71-i. The transmission destination determining circuit 70-i first outputs a command having a first value to the line x'-i, and in response to this command, the selector circuits 80-0 to 80-3 select the REQ[0-7] signal and output it to lines ab-i-0 to ab-i-3. Since the REQ[0-7] signal is 8-bit, "0" is output to the lines ab-i-o to ab-i-3 where the REQ[0-7] signal is not present. Next, the transmission destination determining circuit 70-i outputs a command having a second value to the line x'-i, and in response to this command, the selector circuits 80-0 to 80-3 select respective two bytes of the transaction. This operation is repeated until the whole transaction is selected.

The REQ[0-7] signal and transaction output to the lines ab-i-o to ab-i-3 are input to the crossbar switch 101.

FIG. 13 shows the crossbar switch 101 divided by LSIs. The crossbar switch 101.is constituted of four LSIs 85 to 88. Each input of each LSI is connected by a signal line of two bytes to a corresponding unit, and this is also true for each output port. With LSI division illustrated in FIG. 13, a transaction in the format shown in FIG. 14 is input via the lines ab-i-0 to ab-i-3 to first to fourth slices constituted of LSIs 85 to 88.

Figure 15:
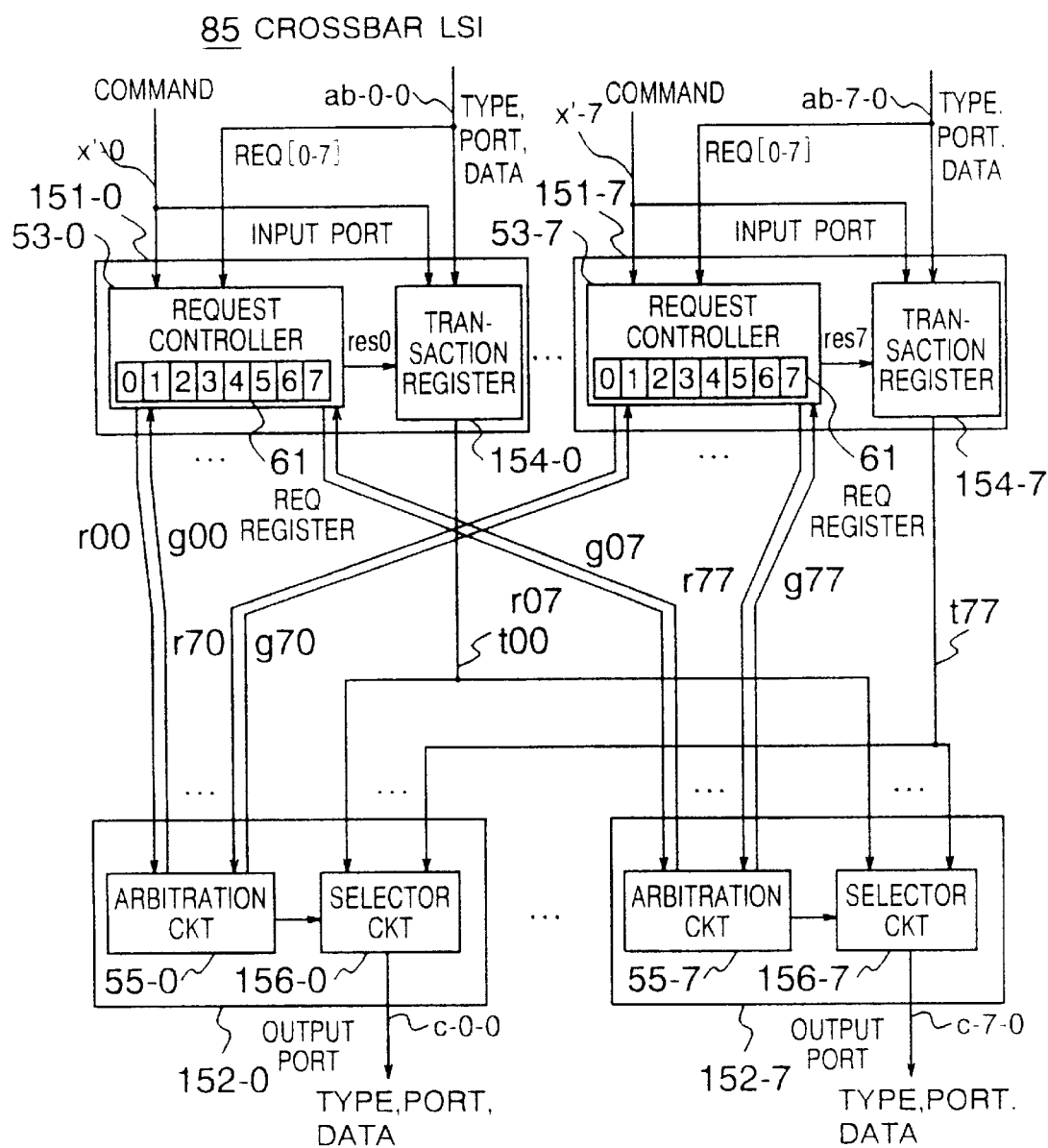
FIG. 15 shows the detailed structure of LSIs constituting the crossbar switch used by the second embodiment.

FIG. 15 shows the internal structure of LSI 85. As shown, this LSI has input ports 151-0 to 151-7 and output ports 152-0 to 152-7 corresponding to the ports 0 to 7 of the crossbar switch 101. The structures of the input ports 151-0 to 151-7 are generally the same as the input ports 51-0 to 51-7 of the crossbar switch of the first embodiment shown in FIG. 9. However, the different points from the first embodiment are that the width of each transaction register, e.g, transaction register 154-0 is two bytes, the signal input line to this register and request controller, e.g., request controller 53-0 is a common signal line, e.g, common signal line ab-0-0 shared by all the ports, and a command different from the first embodiment command is input from the line x'-0 to x'-7.; The structures of the output ports 152-0 to 152-7 are generally the same as the output ports 52-0 to 52-7 of the crossbar switch of the first embodiment shown in FIG. 9. However, the width of the selector circuits 156-0 to 156-7 is two bytes different from the first embodiment.

As the REQ[0-7] signal and one of the four sliced transaction portions are time sequentially input at the port 0 via the line ab-0-0, the request controller 53-0 sets the REQ[0-7] to a REQ register 61 in the request controller 53-0 in response to the first value of the command on the line x'-0. Thereafter, the transaction register 154-0 receives one sliced transaction portion in response to the second value of the command on the line x'-0. The succeeding operations of the system are the same as those of the crossbar switch shown in FIG. 9. The sliced transaction portion is output to lines c-0-0 to c-7-0 in accordance with the values stored in the REQ register. Since the same REQ[0-7] signal is input to other LSIs, the operations same as above are performed to output sliced transaction portions. As a result, transfer of the transaction is completed to a desired unit via lines c-0 to c-7. The operations at the other input ports upon reception of the REQ[0-7] signal and transaction portion are the same as above.

In the above manner, the transaction can be transferred without transferring transfer control signals between LSIs constituting the crossbar switch 101. Since the REQ[0-7] signal is transferred to a data path to each LSI by time division multiplex, most of LSI pins of the crossbar switch 101 can be used for the connection of each unit connected to the crossbar switch 101. This means that the crossbar switch can be formed by a minimum number of LSIs.

If a crossbar LSI of 16 inputs and 16 outputs having, for example, 272 LSI pins is to be formed, the crossbar LSI is designed to be 8-bit slice because (272−16)/(16+16)=8 bits. If the slice width of LSI calculated as above is narrower than the width of the REQ signal, the REQ signal of the above format is not used, but the width of the REQ signal is narrowed through proper encoding or the REQ signal is designed to be transferred over a plurality of cycles.

This embodiment has the above-described freedom of design so that the crossbar switch 101 can be formed by using inexpensive LSIs having a small number of pins.

In the description of the second embodiment, the crossbar switch is divided into four slices of 2-byte width. Obviously, the invention is applicable to a different number of slice divisions. In the above description, although the crossbar switch has eight ports, the invention is applicable to the crossbar switch having a different number of ports.

According to the first and second embodiments, a memory access derived from the cache of a processor unit can be monitored at another cache by using the interconnection network. The input/output units and the like not containing a cache are not adversely affected while permitting such cache monitor. Furthermore, a circuit for determining a destination of an access request to the memory mapped register can be simplified. A circuit for transferring an access request to an input/output device containing a memory mapped register designated by the access request can be simplified, particularly even if the number and combination of input/output devices are changed.

<3rd Embodiment>

The third embodiment pertains to a modification of the structure and control method of a crossbar switch.

Figure 17:
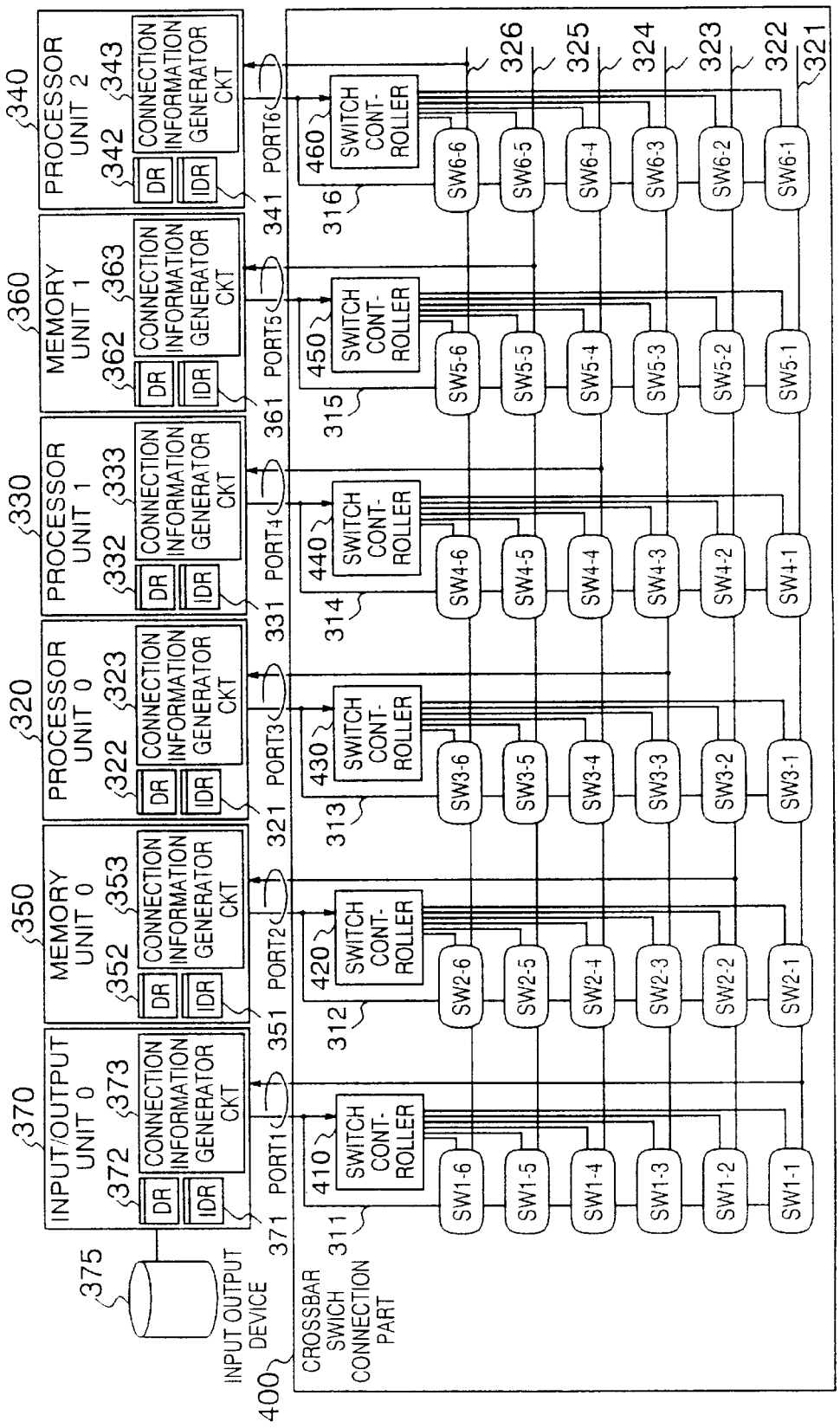
FIG. 17 is a block diagram of a multi-processor system according to a third embodiment of the invention.

The multi-processor system shown in FIG. 17 has basically the same structure as that shown in FIG. 1. The characteristic elements of each unit and the structure of a crossbar switch 400 will be detailed, and the description of other elements similar to those shown in FIG. 1 is omitted.

In this embodiment, the crossbar switch 400 having six ports is connected to three processor units 320, 330, and 340, two memory units 350 and 360, and one input/output unit 370. The input/output unit 370 is connected to input/output devices including a disk drive unit 375, a display (not shown), a keyboard (not show), and the like. The processor unit 330 is connected via a port "1" to the crossbar switch 400 and has a unit identifier register idr 331, a connection information generator circuit 333, and a transfer destination identifier register dr 332, which are characteristic to the invention. The details of these circuits will be later described.

Similarly, each of the other units is connected via a corresponding port to the crossbar switch 400 and has a unit identifier register idr, a connection information generator circuit, and a transfer destination identifier register dr.

The crossbar switch 400 has six switch controllers 410 to 460 and thirty six switches sw1-1 to sw6-6 for interconnection between input ports and output ports.

The switch controller 440 is provided at the input of the port "4" and controls the six switches sw4-1 to sw4-6 to connect an input bus of the port "4" to output buses 321 to 326 of ports "1" to "6".

Similarly, each of the other switch controllers is provided at the input of the port "1" and controls the six switches swi-1 to swi-6 to connect an input bus of the port "i" to an output bus of a desired port, where "i" is a natural number of 1 to 6.

For uni-cast, an input port is connected to a desired output port by closing one switch, and for broadcast, all switches are closed to connect the input port to all output ports at the same time.

The switch controller arbitrates between connection rights of the output ports so as not to connect a plurality of input ports to the same output port. An arbitration circuit for output port connection rights is the same as a bus arbitration circuit of a general bus connected system, and so the description thereof is omitted in this embodiment.

FIG. 18 illustrates one example of a unit identifying method using the contents of the resister idr which is characteristic to this invention. Each unit stores the information illustrated in FIG. 18 in its unit identifier register idr.

FIG. 19 shows the types trtyp of data transfers used by each unit of this embodiment. In this embodiment, data transfers have eight types trtyp including (1) a non-coherent block read request, (2) a non-coherent block read request, (3) a non-coherent block write request, (4) a non-coherent word read request, (5) a non-coherent word read response, (6) a non-coherent word write request, (7) a coherent shared block read request, and (8) a coherent private block read request.

Figures 20, 21, 22:
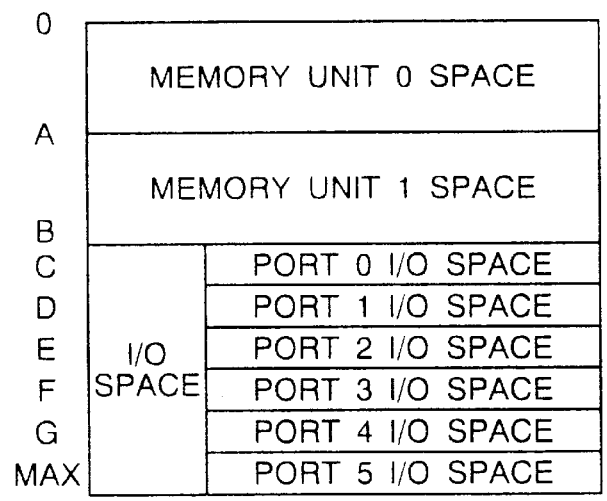
FIG. 20 is a diagram illustrating address allocation.
FIG. 21 is a diagram showing the contents of a transfer destination identifier register.
FIG. 22 is a diagram showing control information.

FIG. 20 is an address space map of the multi-processor system of this embodiment. In this embodiment, an area from address "0" to an address lower than address "A" is assigned to the memory unit 0, an area from address "A" to an address lower than address "B" is assigned to the memory unit 1, and 0, and an area from address "B" is assigned to the I/O space of memory mapped registers and the like.

In this embodiment, the address of the I/O space mapped to control registers of each unit is determined in correspondence with each port. An area from an address "B" to an address lower than address "C" is assigned to the unit of the port "1", an area from an address "C" to an address lower than address "D" is assigned to the unit of the port "2", an area from an address "D" to an address lower than address "E" is assigned to the unit of the port "3", an area from an address "E" to an address lower than address "F" is assigned to the unit of the port "4", an area from an address "F" to an address lower than address "G" is assigned to the unit of the port "5", and an area from an address "G" to an address lower than address "MAX" is assigned to the unit of the port "6".

FIG. 21 shows the values of the transfer destination identifier register dr of this embodiment. In this embodiment, the transfer destination identifier register dr stores two port numbers in order to determine the port of the memory unit assigned the memory area of the address space. The value of the transfer destination identifier register dr is set in accordance with the information stored in the unit identifier register idr which is characteristic to this invention. The operation thereof will be detailed later.

The type trtyp of data transfer and the address space allocation method are the same as those used by a bus connected system and are not specific to this invention.

In this invention, in accordance with the type of data transfer, the address of data to be transferred, and the transfer destination identifier register dr specific to this invention, the connection information generator circuit of each unit specific to this invention determines a destination and outputs a data transfer request along with five types of control information scctl shown in FIG. 22 to the crossbar switch.

The types trtyp of data transfers used by each unit of this embodiment will be described.

In a multi-processor system, in reading data, it is necessary to read latest data which is essentially present in the main memory. In order to confirm whether the latest data is stored in another processor unit, the coherent shared block read request or coherent private block read request is used.

In writing data, in order for another processor unit not to store old data, the data is once read by using the coherent private read request.

For a read request, the address of data is transferred to other processor units to check coherency. However, in transferring the read data, the coherency check is not necessary, and for a read response, the non-coherent block read or non-coherent word read response is used.

If the cache memory of a processor unit stores therein rewritten data, the rewritten data is required to be transferred upon data replace of the cache memory or upon detection of the coherent read request of the data. In these cases, the data is transferred by using the non-coherent block write request and non-coherent block read response, respectively.

All data is not necessarily stored in the cache memory. For example, if a non-cache area is being determined, the processor unit reads data by using the non-coherent block read request. The data such as the data stored in an I/O register, which is not read/written in units of block, is not cached. Therefore, the processor unit uses the non-coherent word read request or non-coherent word write request.

The number of cycles required for data transfer requested by each unit changes with the type trtyp of data transfer. It is necessary for the crossbar switch to have the number of cycles required for data transfer as its control information. In this embodiment, it is assumed that the read request is transferred in 1 cycle for its address, the block write request is transferred in 5 cycles, the block read response is transferred in 4 cycles, the word write request is transferred in 2 cycles, and the word read response is transferred in 1 cycle.

FIG. 22 shows the control information scctl of the crossbar switch which is generated by the connection information generator circuit by using the types trtyp of data transfers and the address of data to be transferred. The type trtyp of data transfer itself is transferred as data to a destination unit. Therefore, the control information scctl of the crossbar switch includes only the information whether data transfer is uni-cast or broadcast, the number of cycles required for data transfer, and the port numbers of source unit and destination unit.

The connection information generator circuit generates the information whether data transfer is uni-cast or broadcast and the number of cycles required for data transfer, in the following manner by using the types trtyp of data transfers. The non-coherent block read request is uni-cast of 1 cycle. The non-coherent block read response is uni-cast of 4 cycles. The non-coherent block write request is uni-cast of 5 cycles. The non-coherent word read request is uni-cast of 1 cycle. The non-coherent word read response is uni-cast of 1 cycle. The non-coherent word write request is uni-cast of 2 cycles. The coherent shared block read request or coherent private block read request is broadcast of 1 cycle.

The connection information generator circuit embeds the port number of its own into an src field of the control information scctl as the transfer source port number.

The connection information generator circuit generates a transfer destination port number in accordance with the types trtyp of data transfers, the address of data, and the transfer destination identifier register dr, and embeds it into a destination field dest of the control information scctl.

If the requested data transfer is a response to the read request, the source port number contained in the field src of the control information scctl supplied to the crossbar switch upon the read request is embedded in the field dest.

If the requested data transfer is the write request or read request and the address is in the memory space, as shown in FIG. 21 the value "1" of dr0 is embedded in the field dest as the transfer destination port number if the address is in an area from address "0" to an address smaller than address "A" and the value "4" of dr1 is embedded in the field dest as the transfer destination port number if the address is in an area from address "A" to an address smaller than address "B", irrespective of uni-cast or broadcast. If the address is in the I/O space, as shown in FIG. 20, embedded in the field dest as the destination port number are "1" if in the area from address "B" to an address smaller than address "C", "2" if in the area from address "C" to an address smaller than address "D", "3" if in the area from address "D" to an address smaller than address "E", "4" if in the area from address "E" to an address smaller than address "F", "5" if in the area from address "F" to an address smaller than address "G", and "6" if in the area from address "G" to an address smaller than address "MAX".

As apparent from the foregoing description, only uni-cast for the I/O space having the port number unanimously determined by a fixed address can transfer data to the crossbar switch prior to setting the value to the transfer destination identifier register dr.

In order to run software of a bus connected system on the multi-processor system of this invention, without modifying the software, it is necessary to provide a procedure of setting correct values to the transfer destination identifier register dr by using only uni-cast for the I/O space. After the correct values are set to the transfer destination identifier register dr, uni-cast or broad-cast for the memory space is performed. This procedure will be described next.

In this embodiment, the unit identifier register idr and transfer destination identifier register dr of each unit are I/O registers mapped to the I/O space of the port connected to the unit. An offset address of the I/O space of each unit is determined in common.

Each processor unit has a ROM storing a boot program which is executed immediately after reset. The processor immediately after reset initializes the cache memory of the processor unit in accordance with the boot program. At this initializing stage, a data transfer request to the crossbar switch will not be generated.

In this embodiment, it is assumed that one main processor unit is selected from a plurality of processor units at this initializing stage. For example, part of the boot program of the main processor unit is made different from the boot program of the other processor units. Alternatively, if there is a signal indicating whether each port is a processor unit, it is easy for the crossbar switch 400 to provide a signal indicating a processor unit having the smallest port number.

The crossbar switch 400 immediately after reset waits for a data transfer request from each port and is in an idle state.

The processor unit other than the main processor unit waits for an interrupt from the main processor unit after the initializing stage. The main processor unit after the initializing stage reads the unit identifier register idr connected to each port, sequentially in the order of port number, by using uni-cast for the I/O space, to thereby identify the port numbers of the memory units.

Thereafter, by using uni-cast for the I/O space, the port numbers of the memory units are set to the transfer destination identifier register dr of each unit.

With the above procedure, the correct values can be set to the transfer destination identifier register dr by using only uni-cast transfer for the I/O space.

In the above embodiment, the I/O space is assigned the address space in correspondence with each port. From this reason, the values are set to the transfer destination identifier register dr by using uni-cast for the I/O space. However, similar to a bus connected system, each unit may be provided with a function of determining from the address whether the data transfer request is an access to its I/O register. In this case, the values can be set to the transfer destination identifier register dr by using only broadcast for the I/O space instead of uni-cast for the I/O space.

In the above embodiment, for the simplicity of description, the memory units of the same type are used. Therefore, in the embodiment the memory units are assigned two memory spaces, one being an area lower than address "A" which is determined by the capacity of one memory unit, and the other being an area from address "A".

If memory units having different capacities are connected, the following two steps are performed.

(1) In addition to the port number, the lowest and highest addresses of an address area assigned to a memory unit are set to the transfer destination register dr.

(2) The connection information generator circuit compares the address of data to be transferred with the lowest and highest addresses. If the address of data to be transferred is in the address area, the port number is embedded in the field dest.

In the above embodiment, the transfer destination identifier register dr can store information of only two ports so that the number of connectable memory units is two at the maximum. In order to increase the number of connectable memory units, it is obvious that the capacity of the transfer destination identifier register dr is increased correspondingly.

Also in the above embodiment, the I/O space has a fixed address in correspondence with each port. This fixed address for each port is required only for the unit identifier register idr and transfer destination identifier register dr. Therefore, these registers are assigned the fixed addresses and the other I/O registers may be provided with the function same as the transfer destination identifier register dr which holds the lowest and highest addresses of the I/O space and the port number similar to the memory space.

<4th Embodiment>

Figure 23:
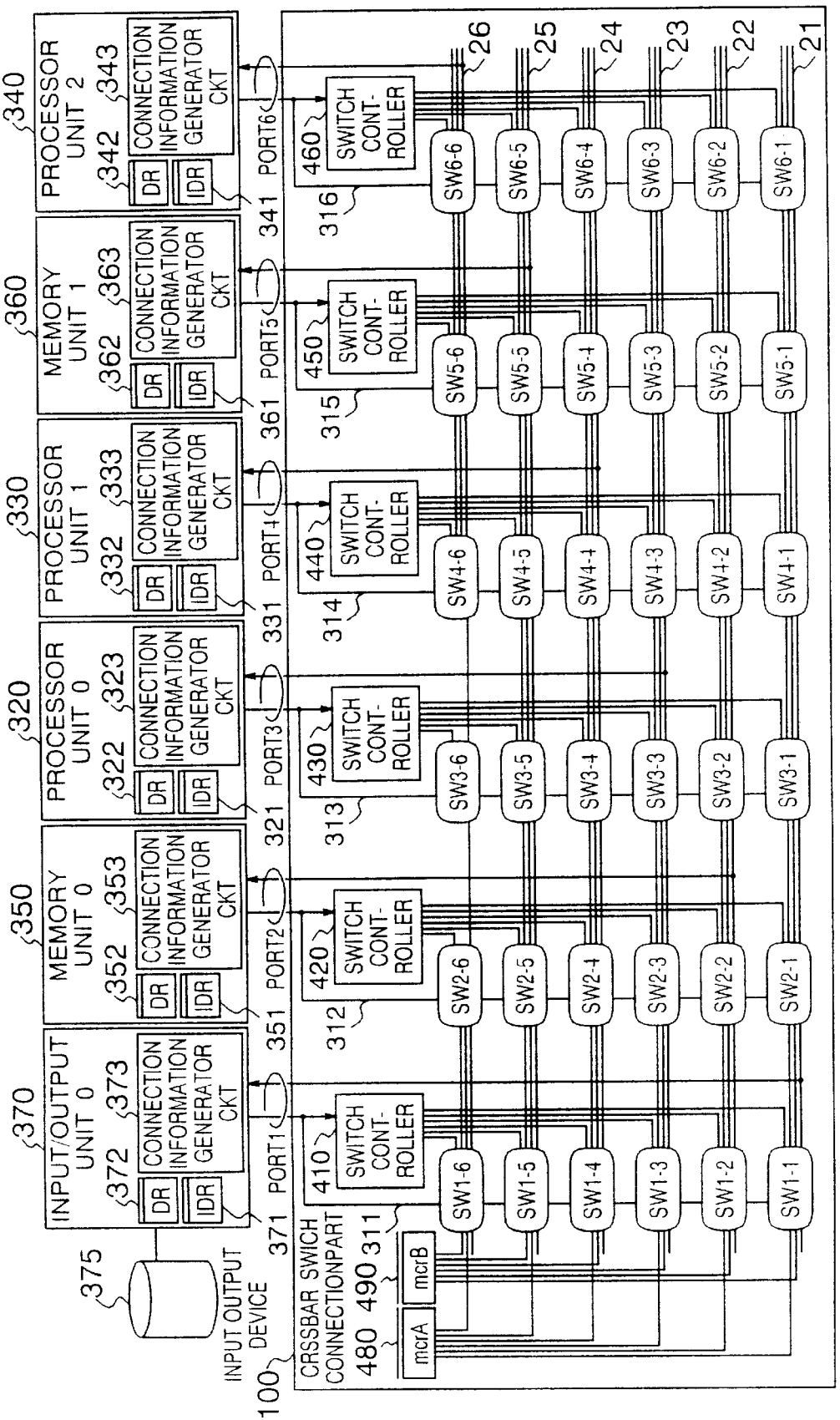
FIG. 23 is a block diagram of a multi-processor system according to a fourth embodiment of the invention.

The fourth embodiment, mainly the different points from the third embodiment shown in FIG. 17, will be described with reference to FIG. 23.

In the third embodiment, broadcast is used for realizing address snoop. In the fourth embodiment, multi-cast is used to transfer a coherent read transaction only to the units which are required to participate in address snoop.

The different points of the fourth embodiment from the third embodiment reside in that the crossbar switch 400 has two multi-cast registers mcr A 480 and mcr B 490 which are one of the characteristic features of the invention and that the switch controllers 410 to 460 generate switch control signals by referring to the multi-cast registers mcr.

The multi-cast register mcr is set with values in accordance with the information of the unit identifier register idr, similar to the transfer destination identifier register dr of the third embodiment. The multi-cast register mcr stores "1" for the port to which multi-cast data transfer is executed, and "0" for the other ports.

Figures 24, 25, 26:
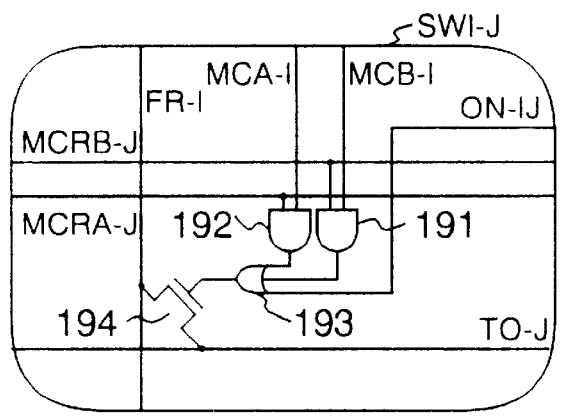
FIG. 24 is a diagram showing the contents of a register.
FIG. 25 is a circuit diagram of a switch.
FIG. 26 is a diagram illustrating connection control information.

FIG. 24 shows an example of the values set to the multi-cast register mcr A 480 for selecting the ports "3", "4", and "6" connected to the processor units to which multi-cast is executed for address snoop and the multi-cast register mcr B 490 for selecting the port "1" connected to the input/output unit 370 to which multi-cast is executed.

FIG. 25 is a circuit di agram of the switch swi-j of the crossbar switch 400 of the fourth embodiment. The switch swi-j of the third embodiment is controlled only by the signal on-ij. In the fourth embodiment shown in FIG. 25, connection of the switch is determined by the values of signals mcrA-j and mcrB-j from the multi-cast registers mcr A and B when signals mcA-i and mcB-i are "b 1".

For address snoop, the coherent read request can be issued at the same time to three processor units and the memory unit indicated by the field dest, by setting "1" to mcA-i.

In the fourth embodiment, as shown in FIG. 26, the control information scctl for the crossbar switch is added with two multi-casts corresponding to the multi-cast registers mcr A and B. For the coherent shared block read request or coherent private block read request, the multi-cast A is used instead of the broadcast of the third embodiment.

Obviously, the multi-cast register mcr can be set with values only by uni-cast transfer for the I/O space in accordance with the information of the unit identifier register idr, similar to the transfer destination identifier register dr of the third embodiment. After the values are set, the multi-cast transfer is used.

It is sufficient that the multi-cast register mcr is set with values immediately before the multi-cast transfer request is issued. Therefore, not only the multi-cast register mcr may be set with values at the initializing stage, but also the values may be changed by software to change the multi-cast transfer destination.

In the above embodiment, the crossbar switch 400 is provided with the multi-cast registers mcr. The multi-cast register mcr may be provided at each unit. In this case, the contents of the multi-cast register mcr are added to the control information scctl for the crossbar switch 400.

In the above embodiment, each bit of the multi-cast register mcr is provided for each port. Each bit of the multi-cast register mcr may be provided for each group of the ports of the crossbar switch 400, e.g., a group of ports "1" and "2", a group of ports "3" and "4", and a group of ports "5" and "6", each group being connected to units of the same type. In this manner, the amount of hardware of the multi-cast register mcr can be reduced.

What is claimed is:

1. A multi-processor system comprising:
   a plurality of processor units;
   a plurality of memory units;
   a plurality of input/output units;
   a network for interconnecting said plurality of processor units, memory units, and input/output units and transferring in parallel a plurality of data sets to and from said plurality of processor units, memory units, and input/output units;
   a plurality of input/output devices connected to one of said plurality of input/output units; and
   a plurality of memory mapped registers contained in one of said plurality of processor units, memory units, input/output units, and input/output devices, wherein:
   each of said memory units has one of a plurality of main memory portions constituting part of a main memory shared by said plurality of processor units, said plurality of main memory portions being assigned a plurality of different local areas in a first area of a predetermined address space;
   said plurality of registers are assigned an area different from said first area of said address space; and
   each of said processor units comprises:
      at least one processor;
      a cache memory for said plurality of main memory portions;
      a cache control circuit for said cache memory, said cache control circuit including means for checking a hit of said cache memory relative to data at an address designated by a data read request supplied from said processor; and
      a transmission destination determining circuit for determining, if said hit check indicates a mishit of said cache memory, said plurality of processor units and one memory unit having one main memory portion assigned one local area to which said designated address belongs, among said plurality of local areas in said first area, as a plurality of destinations of said data read request, and requesting said network to locally broadcast said data read request to said plurality of processor units and said one memory unit.

2. A multi-processor system according to claim 1, wherein:
   said first area of said address space is assigned to a plurality of cachable data sets and a plurality of non-cachable data sets, and said other area different from said first area of said address space is assigned to a plurality of non-cachable data sets; and
   said transmission destination determining circuit determines as a plurality of destinations of said data read request said plurality of processor units and one memory unit having one main memory portion assigned said one local area among said plurality of memory units, if said data read request is a read request of cachable data and said address designated by said data read request belongs to one of said plurality of local areas.

3. A multi-processor system according to claim 1, wherein said network comprises:
   a plurality of input ports each connected to one of said plurality of processor units, memory units, and input/output units;
   a plurality of output ports each connected to one of said plurality of processor units, memory units, and input/output units;
   a plurality of registers each provided for each of said plurality of input ports, said register storing a transfer request input to a corresponding one of said input ports, and said transfer request indicating whether data is transferred to each of said output ports; and
   a switch circuit connected to said plurality of registers for transferring in parallel a plurality of data read requests to and from said plurality of input and output ports, said switch circuit including means responsive to a transfer request stored in any one of said plurality of registers for transferring in parallel a data read request input to the input port of said one register to a plurality of output ports designated by said transfer request among said plurality of output ports,
   wherein said transmission destination determining circuit of each processor unit includes means for supplying said data read request to one input port for the processor unit among said plurality of input ports, as data to be transferred by said network, and for supplying a transfer request requesting one register corresponding to said one input port among said plurality of registers of said network to transfer said data read request to a plurality of output ports corresponding to said plurality of determined destinations.

4. A multi-processor system according to claim 1, wherein:
   said network includes a plurality of large scale integrated (LSI) circuits of the same structure each capable of transferring in parallel a plurality of data sets;
   each LSI circuit comprises:
   a plurality of input ports each connected to one of said plurality of processor units, memory units, and input/output units; and
   a plurality of output ports each connected to one of said plurality of processor units, memory units, and input/output units,
   each of said processor units comprises:
      a bit slice circuit for dividing a data read request supplied from said transmission destination determining circuit of said processor unit into a plurality of request portions same in number as said plurality of LSI circuits;
      means for supplying in parallel said transfer request supplied from said transmission destination determining circuit to said plurality of LSI circuits, said transfer request being transferred to one input port corresponding to said processor unit among said plurality of input ports of each of said LSI circuits;
      means for supplying in parallel said plurality of request portions to said plurality of LSI circuits, after said transfer request being supplied to said plurality of LSI circuits, each of said request portions being transferred to one input port corresponding to said processor unit among said plurality of input ports of one of said plurality of LSI circuits;
      a plurality of transfer data registers provided in correspondence with each of said plurality of input ports of each of said LSI circuits, for storing a data read request input from each corresponding input port;

a plurality of transfer request registers provided in correspondence with each of said plurality of input ports of each of said LSI circuits, for storing a transfer request input from each corresponding input port;

means for setting, when a transfer request is input from one of said plurality of input ports, said transfer request to the register corresponding to said one input port among said plurality of transfer request storing registers, and for setting, when a data read request is input thereafter from said one input port, said data read request to the register corresponding to said one input port among said plurality of transfer data registers; and a switch circuit connected to said plurality of transfer data registers and transfer request registers for transferring in parallel a plurality of data read requests to and from said plurality of input and output ports, said switch circuit including means responsive to a transfer request stored in any one of said plurality of transfer request registers for transferring in parallel a data read request set to one transfer data register corresponding to said one input port to a plurality of output ports designated by said transfer request among said plurality of output ports.

5. A multi-processor system according to claim 1, wherein said one memory unit sends a response to said data read request that was locally broadcast to only said processor unit which is an originator of said data read request.

* * * * *